US008082352B2

(12) United States Patent
Cui et al.

(10) Patent No.: US 8,082,352 B2
(45) Date of Patent: *Dec. 20, 2011

(54) METHOD, SYSTEM, TERMINAL AND DEVICE MANAGEMENT SERVER FOR INSTALLING SOFTWARE COMPONENTS

(75) Inventors: Shouling Cui, Shenzhen (CN); Xiaoqian Chai, Shenzhen (CN); Linyi Tian, Shenzhen (CN); Kepeng Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/082,045

(22) Filed: Apr. 7, 2011

(65) Prior Publication Data
US 2011/0179410 A1    Jul. 21, 2011

Related U.S. Application Data

(63) Continuation of application No. 12/498,611, filed on Jul. 7, 2009.

(51) Int. Cl.
*G06F 15/16* (2006.01)
(52) U.S. Cl. ......... 709/227; 709/221; 717/178; 717/173
(58) Field of Classification Search .................. 709/227, 709/221; 717/178, 173
See application file for complete search history.

(56) References Cited

U.S. PATENT DOCUMENTS

| | | | |
|---|---|---|---|
| 2004/0082737 | A1 | 4/2004 | Hofer et al. |
| 2004/0237084 | A1 | 11/2004 | Kurzweil et al. |
| 2004/0260939 | A1 | 12/2004 | Ichikawa et al. |
| 2005/0055397 | A1 | 3/2005 | Zhu et al. |
| 2005/0097114 | A1 | 5/2005 | Carro |
| 2006/0015626 | A1 | 1/2006 | Hallamaa et al. |
| 2006/0020947 | A1 | 1/2006 | Hallamaa et al. |
| 2006/0031449 | A1 | 2/2006 | Hallamaa et al. |
| 2006/0190608 | A1 | 8/2006 | Sahinoja et al. |
| 2006/0236325 | A1 | 10/2006 | Rao et al. |

FOREIGN PATENT DOCUMENTS

| | | |
|---|---|---|
| CN | 1455329 A | 11/2003 |
| CN | 1534429 A | 10/2004 |
| CN | 1598851 A | 3/2005 |
| CN | 1705872 A1 | 4/2006 |

(Continued)

OTHER PUBLICATIONS

"Software Component Management Object," Draft Version 1.0-25 May 2007, Open Mobile Alliance, OMA-TS-DM-SCOMO-V1 0200070525 D.

(Continued)

*Primary Examiner* — Kyung H Shin
(74) *Attorney, Agent, or Firm* — Conley Rose, P.C.; Grant Rodolph

(57) ABSTRACT

A method for installing software components includes: a terminal receives a software component package delivered by a Device Management (DM) server directly or a download address of the component package and a command instructing to download delivered by the DM server, where the software component package contains more than one software component; if the terminal receives the download address and the command instructing to download, the terminal downloads the software component package from the download address; the terminal installs the obtained software component package locally and generates management nodes and subnodes of the management nodes corresponding to the software components under a Deployed subtree of the Software Component Management Object (SCOMO) of the terminal. With the present invention, the process of installing software component is more reasonable. A system and apparatus for installing software components are also provided.

18 Claims, 19 Drawing Sheets

FOREIGN PATENT DOCUMENTS

| | | |
|---|---|---|
| CN | 1758607 A | 4/2006 |
| CN | 1859194 A | 11/2006 |
| CN | 1863095 A | 11/2006 |
| WO | 2006003254 A1 | 1/2006 |
| WO | 2006003256 A1 | 1/2006 |
| WO | 2006003257 A1 | 1/2006 |
| WO | 2006087422 A1 | 8/2006 |

OTHER PUBLICATIONS

Foreign communication from a counterpart application, PCT application PCT/CN2008/071270, International Search Report dated Sep. 25, 2008.

Foreign communication from a counterpart application, PCT application PCT/CN2008/071270, English Written Opinion dated Sep. 25, 2008.

Foreign communication from a counterpart application, CN application No. 200710130148.7, Office Action dated Jul. 20, 2010 and Partial English Translation.

Foreign communication from a counterpart application, KR application 10-2009-7015237, Office Action dated Dec. 23, 2010.

"SCOMO Tree," OMA-DM-SCOMO-2007-0029-CR_SCOMO_TREE.DOC, Apr. 13, 2007.

"SCOMO Tree," OMA-DM-SCOMO-2007-0029R01-CR_SCOMO_TREE.DOC, Apr. 13, 2007.

METHOD, SYSTEM, TERMINAL AND DEVICE MANAGEMENT SERVER FOR INSTALLING SOFTWARE COMPONENTS

CROSS-REFERENCE TO RELATED APPLICATIONS

This application is a continuation of U.S. patent application Ser. No. 12/498,611, filed Jul. 7, 2009, which is a continuation of International Application No. PCT/CN2008/071270, filed Jun. 11, 2008, which claims priority from Chinese Patent Application No. 200710111788.3, filed Jun. 11, 2007, Chinese Patent Application No. 200710123436.X, filed Jun. 22, 2007, and Chinese Patent Application No. 200710130148.7, filed Jul. 20, 2007, all of which are incorporated herein by reference in their entirety.

TECHNICAL FIELD

The present disclosure relates to data transport technologies in the communication field, and in particular, to a method, system, terminal and device management server for installing software components.

BACKGROUND

Mobile terminals are an important part in an entire mobile network system. With Device Management (DM), data is downloaded from the network to a terminal device via an Over The Air (OTA) mechanism and the terminal device reads the downloaded data and further completes subsequent installation and configuration of the software components. Meanwhile, service information required by the user and function information of the terminal device are transferred from the terminal device to the DM server automatically. Thus, a Device Management System (DMS) provides a cost-effective solution for maintaining and managing data in a terminal device, including setting initial configuration information of a terminal device, installing and updating permanent information on the terminal device, and extracting management information from the terminal device, as well as processing different types of event and alarm information generated by the terminal device.

Now it is able to download, install and remove software components for a terminal device. The following describes how a software component is downloaded and installed to illustrate the technical solution of the conventional art.

In the conventional art, a Software Component Management Object (SCOMO) is stored in the management tree of a terminal device. A DM server delivers an Exec command to an executable node in the SCOMO to manage software components.

FIG. 1 shows a partial structure of a SCOMO in the conventional art. The download and installation process includes: the DM server downloads a software component by operating on the Download subtree and the Delivered subtree of the SCOMO; after the terminal downloads the component, the DM server delivers an Exec command to the executable node of the SCOMO; the terminal device executes the command to install the software component. The node that receives the Exec command is an Install node or an Install Inactive node in the Delivered subtree. After the installation is complete, the terminal reports the installation result to the DM server. If the reporting mode is asynchronous, the terminal reports the installation result by sending a Generic Alert. The information reported includes a Uniform Resource Identifier (URI) of the installed software component. If the reporting mode is synchronous, the terminal reports the execution result code of the Exec command via a Status command corresponding to the Exec command.

However, the conventional DM solution for downloading and installing a software component is subject to the following defects:

1. In the process of installing and managing a software component, parameters are not supported so that the operation may fail. For example, the installation of a software component may require information such as a serial number. In addition, personalized management is not supported to the extent needed to meet various user requirements.

2. After the installation is complete, due to the lack of an access control right assignment method for the installed component object, the security level may be degraded.

BRIEF SUMMARY

Embodiments of the disclosure may provide a method, system, terminal and device management server for installing software components.

According to some embodiments, there is provided a method for installing software components including:

receiving, by a terminal, a software component package directly delivered by a DM server or a download address of the software component package and a command instructing to download delivered by the DM server, where the component package contains one or more components;

downloading, by the terminal, the component package from the download address if the terminal receives the download address and the command instructing to download; and by the terminal, installing the obtained component package locally and generating management nodes corresponding to the components as well as subnodes of the management nodes under a Deployed subtree of a SCOMO.

According to some embodiments, there is also provided a system for installing software components including:

a DM server, adapted to deliver a software component package directly to a terminal or deliver a download address of the component package and a command instructing to download to the terminal, where the component package contains more than one component; and the terminal, adapted to receive the component package delivered by the DM server, or the download address of the component package and the command instructing to download delivered by the DM server, and if the download address and the command instructing to download are received, download the component package from the download address, install the obtained component package locally, and generate management nodes corresponding to the components and subnodes of the management nodes under a Deployed subtree, According to some embodiments, there is also provided a terminal including:

a receiving unit, adapted to receive a software component package delivered by a DM server or a download address of the component package and a command instructing to download delivered by the DM server, where the component package contains more than one component;

a downloading unit, adapted to download the component package from the download address if the terminal receives the download address and the command instructing to download; and an installing unit, adapted to install the obtained component package locally and generate management nodes corresponding to the components as well as subnodes of the management nodes under a Deployed subtree of a SCOMO.

According to some embodiments, there is also provided a DM server including:

a delivering unit, adapted to deliver a software component package directly to a terminal via a DM command or deliver a download address of the component package and a command instructing to download to the terminal, where the component package contains more than one component; and a receiving unit, adapted to receive a message reported by the terminal, where the message includes one or more of the following items: URI of a management node generated under a Delivered subtree, URIs of management nodes generated under a Deployed subtree, name and ID of the component package, and names and IDs of the components.

With the method, system, terminal and DM server provided in embodiments of disclosure, the process of installing software components is more reasonable.

DETAILED DESCRIPTION OF THE DISCLOSED EMBODIMENTS

Figure 1:
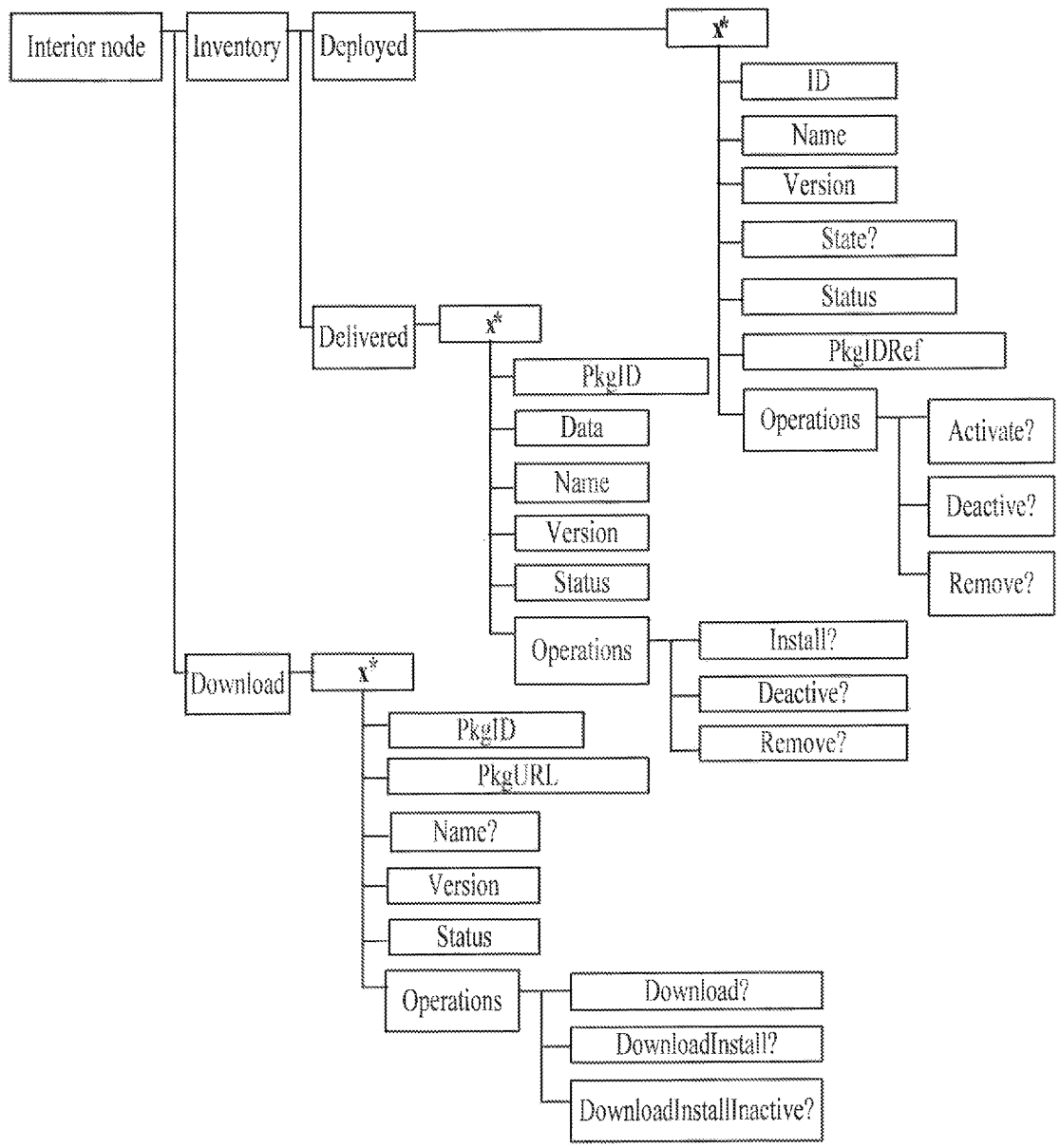
FIG. 1 shows a partial structure of a SCOMO in a conventional art.
Figure 2:
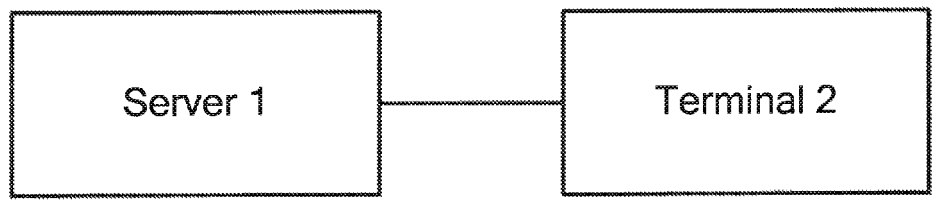
FIG. 2 shows a structure of a system provided in an embodiment of the disclosure.

As shown in FIG. 2, a system in an embodiment of the invention includes a DM server 1 and a terminal 2, where the DM server 1 is adapted to deliver a software component package that contains more than one software component to the terminal 2 directly via a DM command directly or adapted to deliver the download address of the software component package and a command instructing to download to the terminal 2; the terminal 2 is adapted to receive the software component package or the download address of the software component package and the command instructing to download delivered by the DM server 1; if the download address of the software component package and the command instructing to download are received, the terminal 2 downloads the software component package according to the download address, installs the obtained software component package locally, and generates management nodes corresponding to the components and subnodes of the management nodes under a Deployed subtree.

If the command instructing to download is DownLoad, after the terminal 2 downloads the component package according to the download address and before the component package is installed locally, or if the command instructing to download is DownLoadInstall or DownLoadInstallInactive, after the terminal 2 downloads the software component package according to the download address but fails to install the software component package, the terminal 2 is further adapted to generate a management node corresponding to the software component package and subnodes of the management node under a Delivered subtree and assign access control rights to the management node and the subnodes.

Before the terminal 2 generates the management node corresponding to the software component package under the Delivered subtree, the terminal 2 may be adapted to judge whether the ID of the downloaded software component package is identical with the ID of a component package corresponding to a management node and its subnodes already existing under the Delivered subtree; if so, the terminal 2 modifies information of the management node and the subnodes already existing under the Delivered subtree to information of the downloaded package; or else, the terminal 2 generates a management node corresponding to the downloaded package and subnodes of the management node under the Delivered subtree.

The DM server 1 is further adapted to instruct the terminal 2 to generate a management node for the component package under the Download subtree before delivering the command instructing to download; the terminal 2 is further adapted to set access control rights of the management node generated under the Download subtree as access control rights of the management node generated under the Delivered subtree; or the terminal 2 is adapted to set access control rights of the management node generated under the Delivered subtree to null so that the management node inherits the access control rights of its parent node, or set specific access control rights for the management node generated under the Delivered subtree, or combine access control rights of the management node generated under the Download subtree and access control rights of the parent node of the management node generated under the Delivered subtree and set the combined access control rights as the access control rights of the management node generated under the Delivered subtree.

The DM server 1 may be adapted to instruct the terminal 2 to generate a management node for the software component package under the Download subtree before delivering the command instructing to download; if the terminal 2 judges that the downloaded software component package is identical with the software component package corresponding to a management node already existing under the Delivered subtree, the terminal 2 is further adapted to set the sum of access control rights of the management node generated under the Download subtree and access control rights of the management node already existing under the Delivered subtree as the access control rights of the management node generated under the Delivered subtree.

The terminal 2 is further adapted to let a subnode of the management node generated under the Delivered subtree inherit the access control rights of the management node, or set the access control rights of an executable node under the Download subtree as the access control rights of an executable node of the management node generated under the Delivered subtree.

The terminal 2 may also be adapted to receive the DM command delivered by the DM server 1 for a Delivered subtree node and judge whether the DM server 1 has the right to execute the DM command on the node according to the access control rights assigned to the node, and if the DM server 1 has the right, execute the DM command on the node.

The DM server 1 is further adapted to send a parameter to the terminal 2; then the terminal 2 is further adapted to download the software component package, or install the software component package, or remove the software component package, or activate the software components, or deactivate the software components, or remove the software components according to the parameters.

The DM server 1 is further adapted to instruct the terminal 2 to add a subnode to the SCOMO of the terminal 2 before sending the parameters to the terminal 2.

The DM server 1 may also be adapted to send the parameters to the terminal 2 via a DM command which instructs the terminal 2 to download, install or remove the software component package, or instruct the terminal 2 to activate, deactivate or remove the software components.

The terminal 2 is further adapted to judge whether the software component package contains a software component that is identical with a software component corresponding to a management node and its subnodes already existing under the Deployed subtree after installing the software component package and before generating the management node and its subnodes corresponding to the component under the Deployed subtree. If so, the terminal 2 is adapted to modify information of the management node and its subnodes under the Deployed subtree to information of the component in the software component package; otherwise, the terminal 2 is adapted to generate a management node and its subnodes corresponding to the software component in the software component package under the Deployed subtree.

The terminal 2 is further adapted to determine that two software components are identical if judging that IDs or names of the software components are the same; otherwise, the terminal determines that the two software components are different.

If judging that one software component in the software component package is identical with a software component corresponding to a management node already existing under the Deployed subtree, the terminal 2 is further adapted to modify information of the management node under the Deployed subtree to information of the software component in the software component package and set the sum of access control rights of the management node generated for the software component package under the Delivered or Download subtree and access control rights of the management node already existing under the Deployed subtree as the access control rights of the management node generated under the Deployed subtree.

Before delivering the software component package to the terminal 2, the DM server 1 is further adapted to instruct the terminal 2 to generate a management node corresponding to the software component package under the Delivered subtree, and the management node includes software component information; the terminal 2 is then further adapted to store the software component information included in the management node under the Delivered subtree into the Deployed subtree.

The terminal 2 is further adapted to set access control rights for the management node and subnodes of the management node after generating the management node corresponding to the software component under the Deployed subtree.

The terminal 2 is also adapted to set access control rights of the management node corresponding to the software component package generated under the Delivered or Download subtree as access control rights of the management node generated under the Deployed subtree, or set access control rights of the management node generated under the Deployed subtree to null so that the management node inherits access control rights of its parent node, or set specific access control rights for the management node generated under the Deployed subtree, or combine access control rights of the management node under the Delivered or Download subtree and access control rights of the parent node of the management node generated under the Deployed subtree and set the combined access control rights as the access control rights of the management node generated under the Deployed subtree.

The terminal 2 is also adapted to let the subnodes of the management node generated under the Deployed subtree inherit access control rights of the management node, or set access control rights of an executable node under the Delivered or Download subtree as access control rights of an executable node of the management node generated under the Deployed subtree.

After the terminal 2 generates the management node corresponding to the software component under the Deployed subtree, the terminal 2 is further adapted to receive the DM command delivered by the DM server 1 for the Deployed subtree node, and judge whether the DM server 1 has the right to execute the DM command on the node according to access control rights assigned to the node, and if the DM server 1 has the right, execute the DM command on the node.

After the terminal 2 generates the management node corresponding to the component under the Deployed subtree, the terminal 2 is further adapted to report an installation response message to the DM server 1, and the installation response message includes: URI of the management node generated under the Deployed subtree.

If the command instructing to download carries DownLoad as an indirect download instruction, after the download is complete and before the software component package is installed, or if the command instructing to download carries DownLoadInstall or DownLoadInstallInactive as an indirect download instruction, when the download is complete but the installation fails, the terminal 2 reports a download response message to the DM server 1, and the download response message includes: URI of the management ode generated under the Delivered subtree.

The download response message and the installation response message are reported in a synchronous or asynchronous mode.

If the reporting mode is synchronous, the terminal 2 is further adapted to carry the URI in the download response message or the installation response message via an Item element of a Status command.

The download response message further includes a name and/or ID of the software component package; the installation response message further includes a name and/or ID of the software component.

If the Download instruction is used for direct download or indirect download, after generating the management node corresponding to the software component under the Deployed subtree, the terminal 2 is further adapted to set the state of the package to Installed.

The following describes embodiments of the disclosure in detail.

Figure 3:
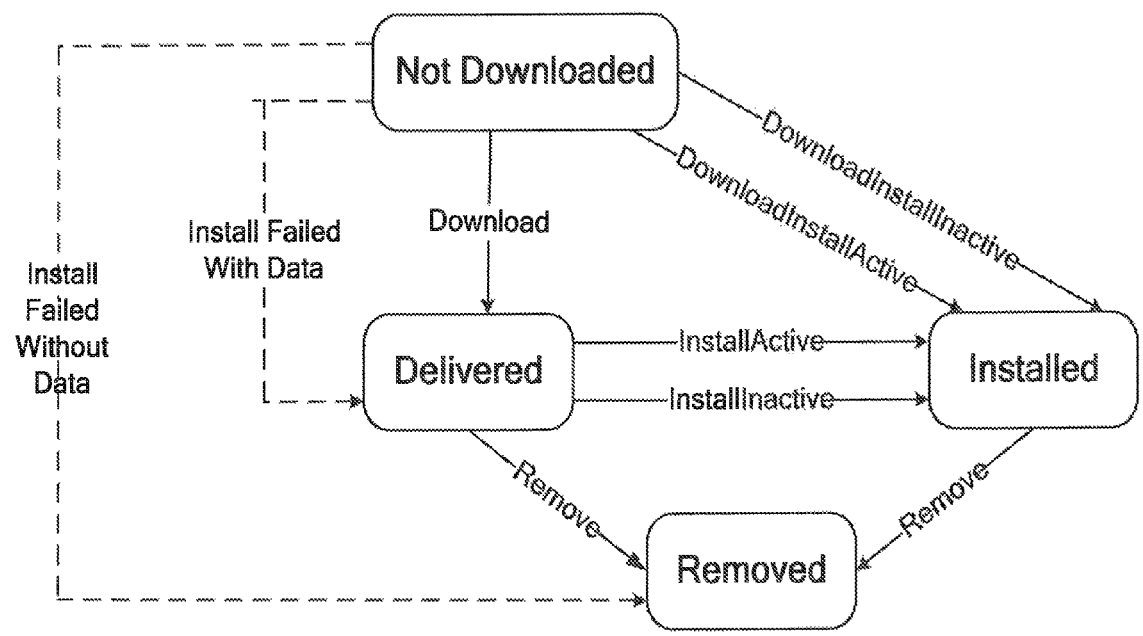
FIG. 3 shows the state transition of a software component package in a terminal in an embodiment of the disclosure.

FIG. 3 shows the state transition of a delivered software component package in a terminal in an embodiment of the disclosure. As shown in FIG. 3, the delivered software component package may be in any of the four states: Not Download indicates the software component package is not downloaded by the terminal and does not exist in the terminal; Delivered indicates the software component package is downloaded by the terminal but not yet installed; installed indicates the software component package is installed; Removed indicates the software component package is removed. The software component package may transit from one state to another among the four states. For example, after the software component package is downloaded, the software component package state changes from Not Downloaded to Delivered; then the software component package state changes from Delivered to Installed after the software component package is installed, when the software components in the software component package may be activated or not activated; when the software component package is removed, without being installed, the software component package state changes from Delivered to Removed; when the software component package is removed after being installed, the software component package state changes from Installed to Removed; if the installation fails and the software component package is not removed from the terminal, the software component package state changes from Not Downloaded to Delivered; if the installation fails and the software component package is removed, the software component package state changes from Not Downloaded to Removed; if the software component package is downloaded and directly installed, the software component package state changes from Not Downloaded to Installed, when the software components in the software component package may be activated or not activated. It is apparent that the software component package exists in the Download subtree and the Delivered subtree. The Not Downloaded and Removed states may be combined to one Idle state, indicating that the software component package is not downloaded or is already removed, which means the software component package does not exist in the terminal.

Figure 4A:
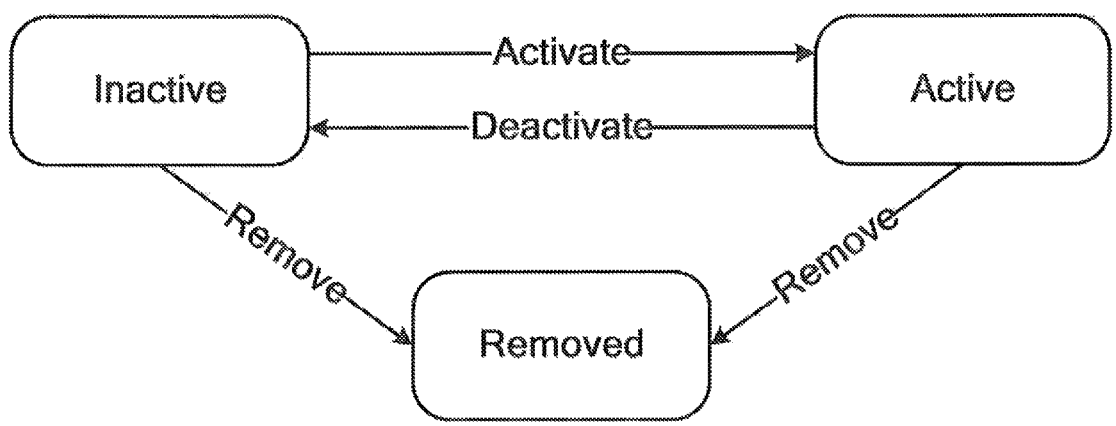
FIG. 4A shows the state transition of a software component in a terminal in an embodiment of the disclosure.

Software components exist in the Deployed subtree. FIG. 4A shows the state transition of a software component in a terminal. Inactive indicates the software component is installed but not available because it is not activated; Active indicates the component is installed and activated and the software component is now available; Removed indicates the software component is removed. A software component may transit from one state to another among the three states. When the component is activated, the software component state changes from Inactive to Active; conversely, the software component state changes from Active to Inactive; if the software component is removed without being activated, the software component state changes from Inactive to Removed; if the software component is removed when activated, the software component state changes from Active to Removed. The Removed state may be changed to Idle, indicating that the software component is not installed or is removed, which means the software component does not exist in the terminal. When a software component package is in the Installed state, the state of the software components contained in the software component package changes from Idle to Active or Inactive. When a software component is removed, the software component state changes from Active or Inactive to Idle.

Figure 4B:
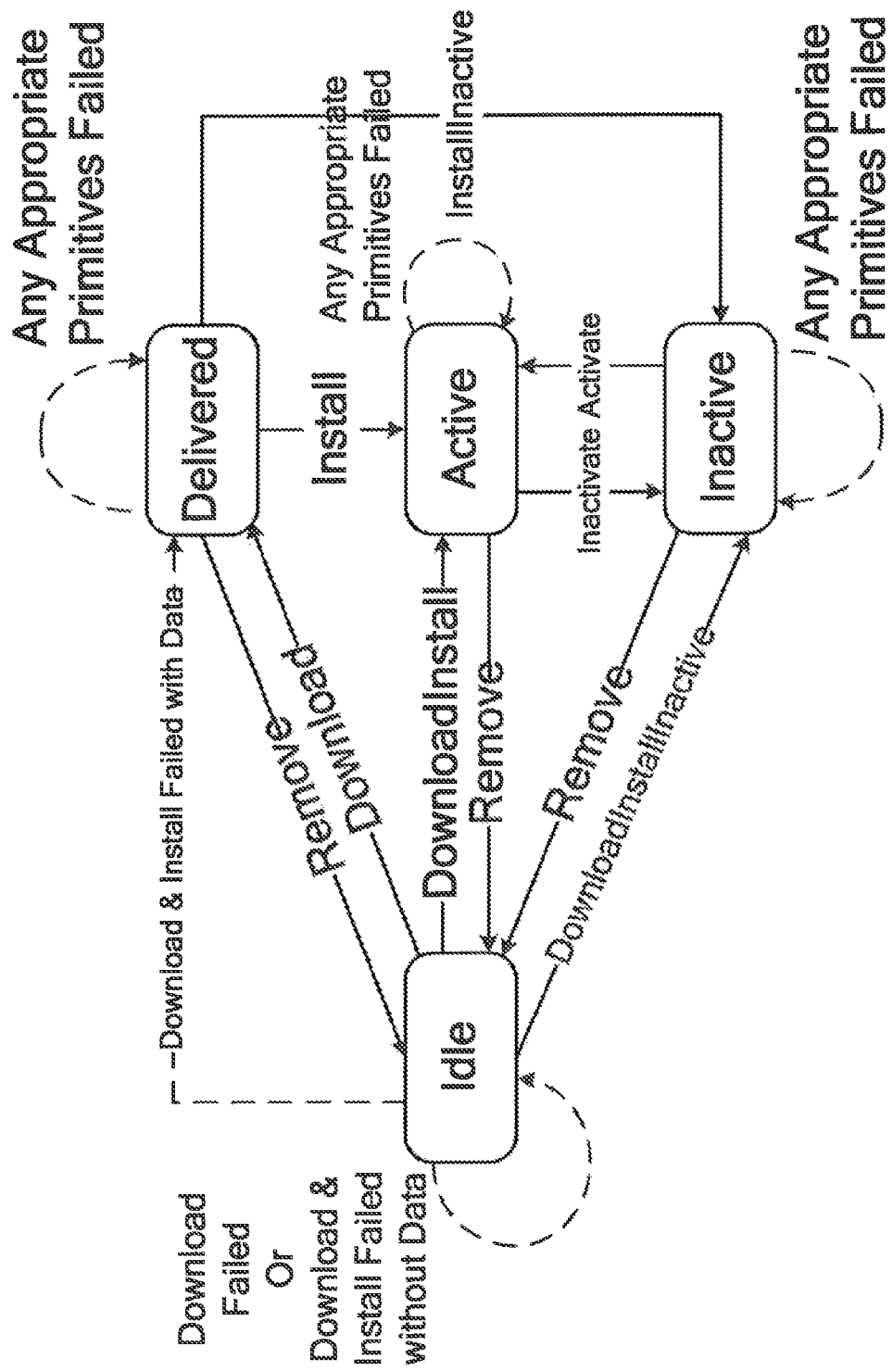
FIG. 4B shows the state transition of a software component in a terminal in another embodiment of the disclosure.

In an embodiment of the disclosure, a software component package may be a means of encapsulating and delivering one or more software components without being managed. In this embodiment of the disclosure, the software component package may have no state transition while only software components have transition of states. In this case, the state transition of a software component is shown in FIG. 4B. Idle indicates the software component is not downloaded, not installed, or already removed; Delivered indicates the software component is downloaded but not installed; Inactive indicates the software component is installed but not activated and therefore not available; Active indicates the software component is installed and activated and therefore available. In FIG. 4B, a broken line means the state is not changed after an operation fails, and a real line indicates a normal operation process. A software component may transit from one state to another among four states. When the software component is only downloaded or when the software component is downloaded but the installation fails, the software component state changes from Idle to Delivered (when the download fails, the state remains unchanged); when the software component is installed, the component state changes from Idle or Delivered to Act or Inactive (when the installation fails, the state remains unchanged); When the software component is activated, the software component state changes from Inactive to Active (when the activation fails, the state remains unchanged); when the software component is deactivated, the software component state changes from Idle, or Delivered, or Active to Inactive (when the deactivation fails, the state remains unchanged); if the software component is removed, the software component state changes from Delivered, or Inactive, or Active to Idle (when the removal fails, the state remains unchanged).

One software component package may contain one or more software components. One software component may represent one application program, an antivirus patch, or a library file of one application program. Before a software component is installed, the software component must be placed in a software component package. After the software component package is downloaded and successfully installed, the software component becomes a deployed component.

Figure 5:
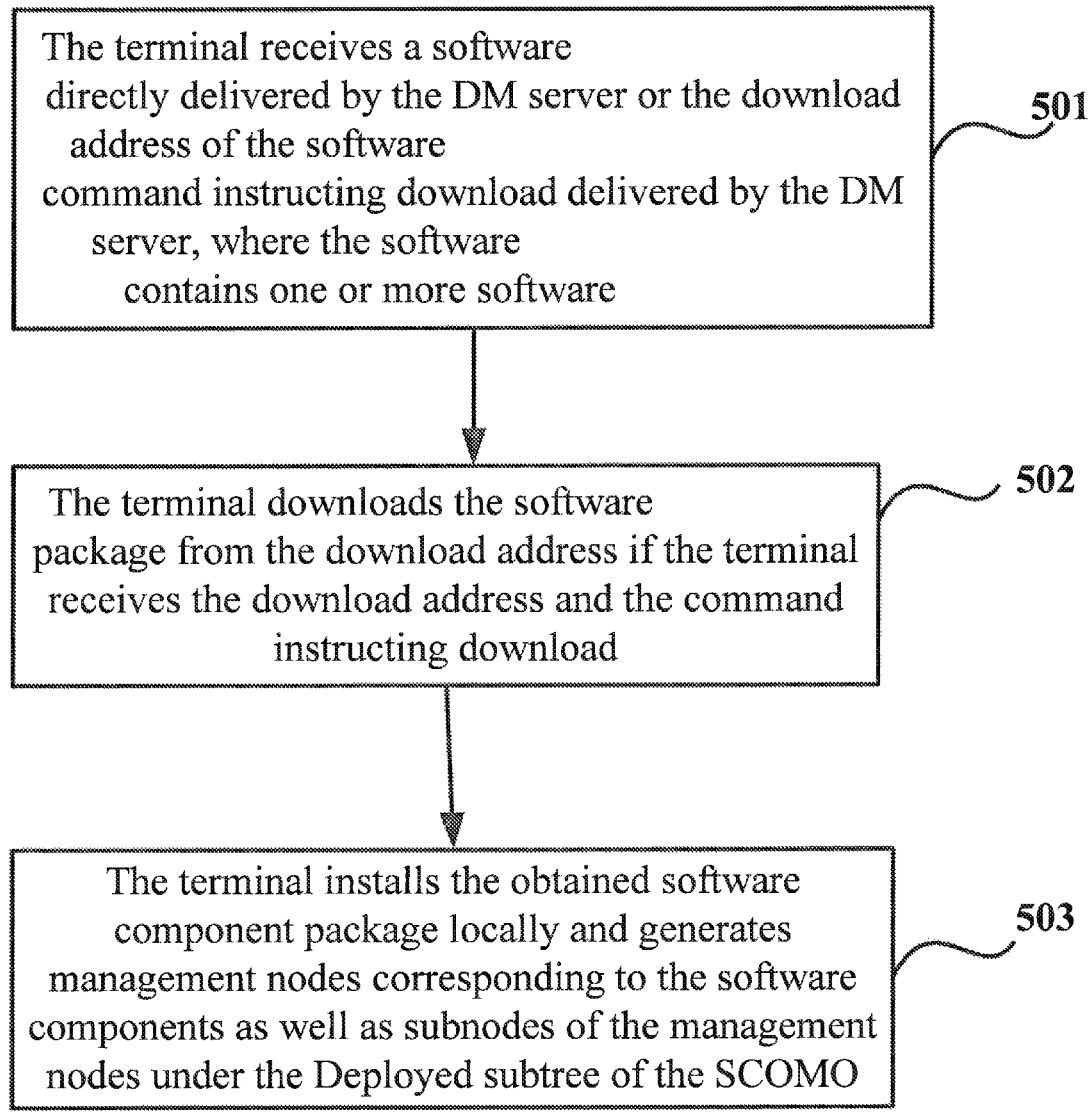
FIG. 5 shows a flowchart of a method in a first embodiment of the disclosure.

FIG. 5 shows a flowchart of the first method embodiment of the disclosure. In this embodiment, the name of a software component package is ascendo; the software component package ID is PkgID__1; the software component package contains three software components of which the names are respectively ascendo__1, ascendo__2, and ascendo__3 and the IDs are respectively ComID__1, ComID__2, and ComID__3. The flowchart includes the following steps:

Step 501: A DM server delivers the software component package to a terminal directly via a DM command or delivers the download address of the package and a command instructing to download to the terminal. The software component package contains more than one software component.

The DM server first determines the download mode of the terminal. If the download mode is indirect, the DM server delivers the software component package to the terminal directly via a DM command; if the download mode is indirect, the DM server delivers the download address of the software component package and the command instructing to download to the terminal, and the download address of the software component package and the command instructing to download may be delivered in one DM session or different DM sessions. The DM server may deliver the command instructing to download to the terminal repetitively for one download address.

For easy management, the DM server may send an instruction related parameter to the terminal before delivering the operation instruction which may be an instruction to download, install, remove, or activate/deactivate a software component. The terminal executes the instruction according to the parameter. The parameter may be delivered in two methods. One is to add a node to the software component management tree of the terminal and the server delivers the parameter via the node. The other method is to carry the parameter directly in the Data element of the delivered Exec command. The following explains the parameter delivery method by describing how to deliver a parameter related to the instruction to install a software component. Other instruction related parameters are delivered in the same method. Before the terminal installs the software component package, the DM server delivers a parameter to the terminal if necessary. This means the DM server may deliver the parameter when the DM server delivers the software component package via a DM command or delivers a command instructing to download or an installation command. The parameter may instruct the terminal to install only certain software components in the software component package, for example, only Java related components or C++ related components. The parameter may also indicate the processing policy for the terminal to generate a Deployed subtree after the installation. Or, the DM server may deliver the parameter at other time depending on the actual need. In the subsequent installation process, the terminal can install the downloaded software component package locally according to the parameter. There are multiple parameter delivery modes. For example, the DM server instructs the terminal to generate a management node for the software component package under a subtree of the SCOMO and add a subnode for the management node, and delivers the parameter to the subnode directly; or the DM server may deliver the parameter to the terminal directly via a DM command. The latter mode is described in step 503. In this step, the former mode is described as follows:

The DM server instructs the terminal to generate a management node for the software component package under a subtree of the SCOMO and add a subnode for the management node. The subtree where the management node is generated varies with the download mode. The download mode may be direct or indirect, where indirect download further includes download via the Dow instruction and download via the DownLoadInstall or DownLoadInstallInactive instruction.

Figure 6:
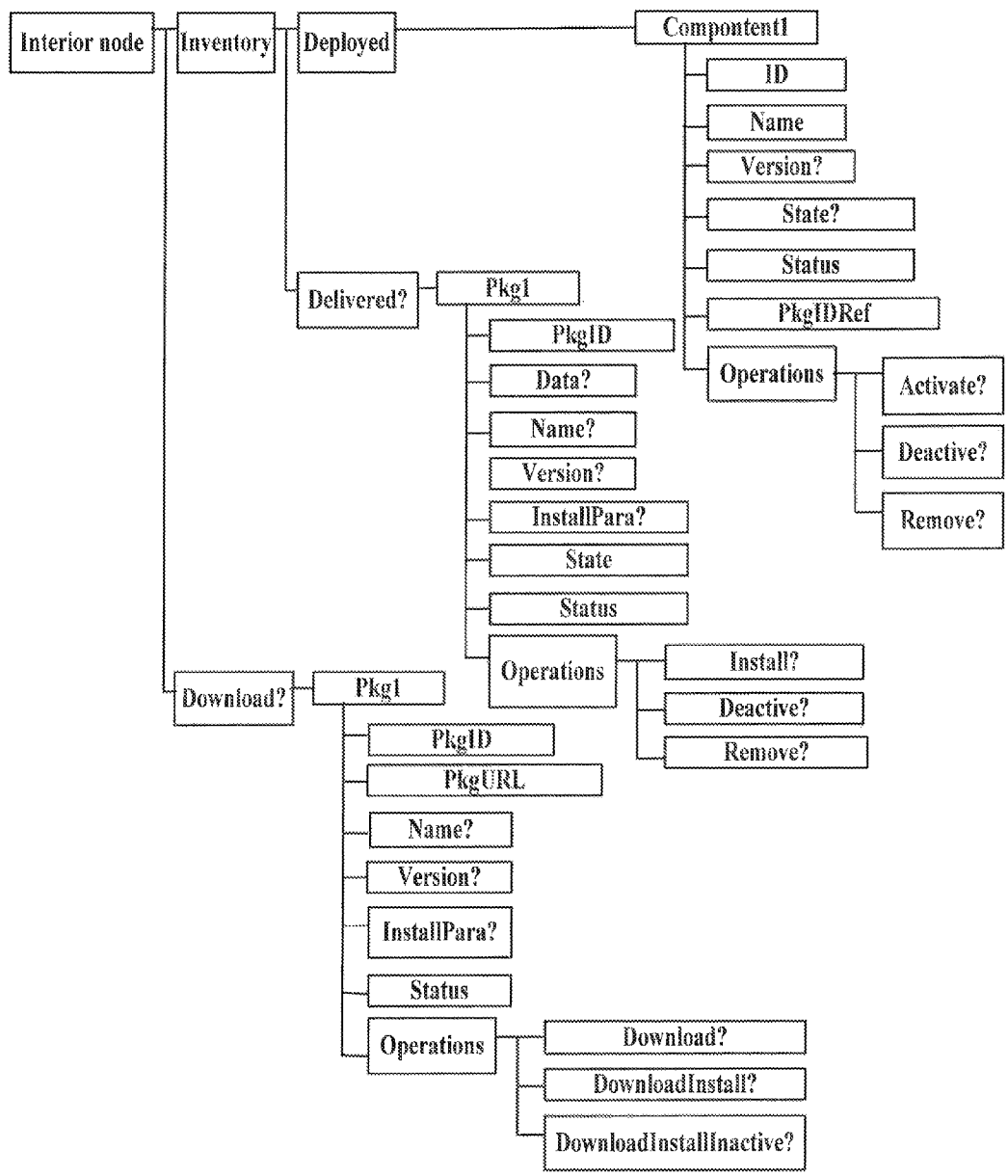
FIG. 6 shows a structure of a SCOMO that downloads and installs software components when download is indirect in the first embodiment of the disclosure.

If download is indirect, the DM server instructs the terminal to generate a management node for the software component package under the Download subtree. As shown in FIG. 6, the terminal generates a management node named Pkg1 under the Download subtree and adds a subnode for the management node to store the parameter delivered by the DM server. The subnode may be named InstallPara. In this download mode, the DM server may deliver the parameter to the Download/Pkg1/InstallPara subnode, where Pkg1 is the name of the generated management node.

Figure 7:
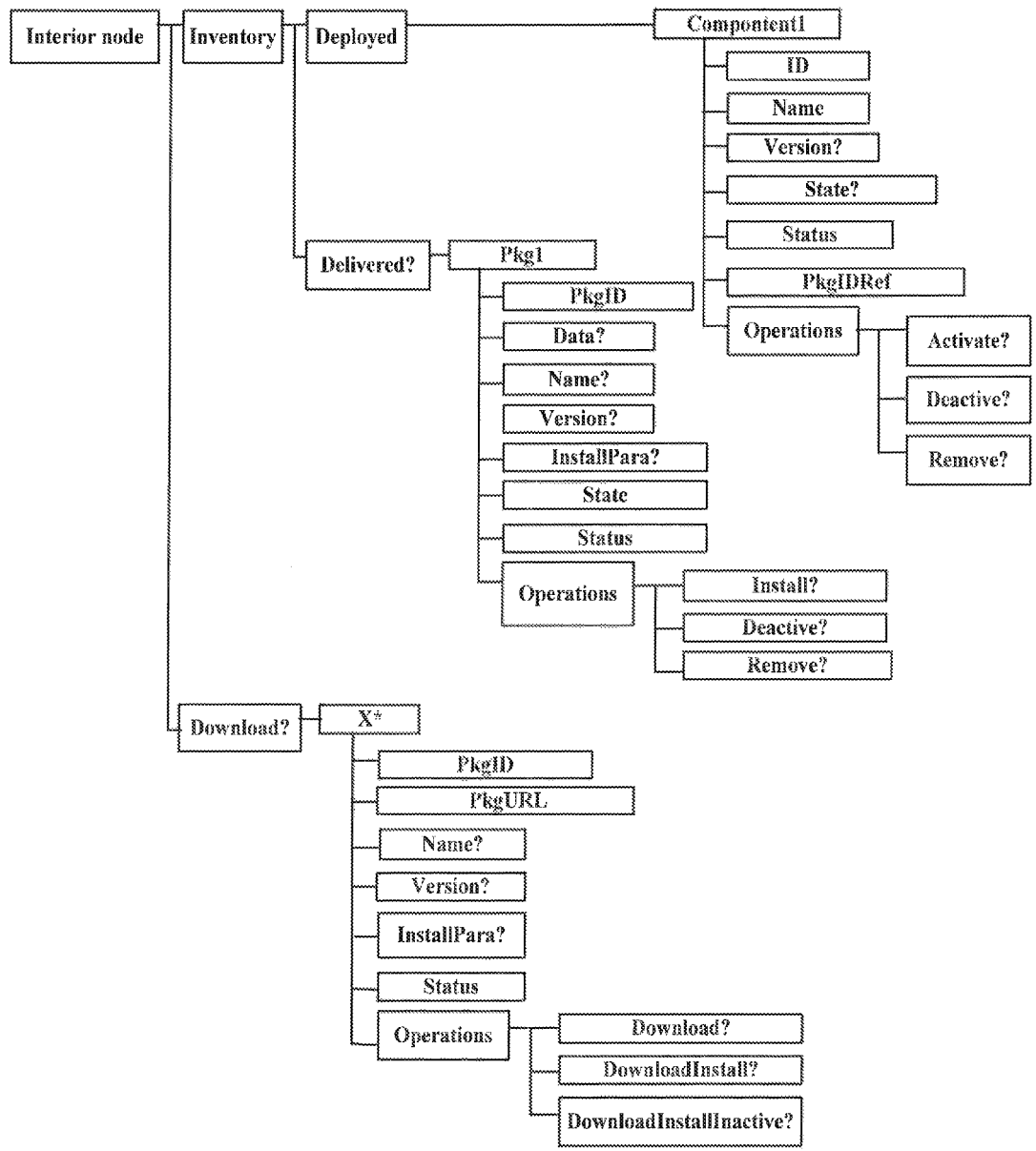
FIG. 7 shows a structure of a SCOMO that downloads and installs software components when download is direct in the first embodiment of the disclosure.

If download is direct, the DM server instructs the terminal to generate a management node for the software component package under the Delivered subtree. As shown in FIG. 7, the terminal generates a management node named Pkg1 under the Delivered subtree and adds a subnode for the management node to store the parameter delivered by the DM server. Likewise, the subnode may be named InstallPara. In this download mode, the DM server may deliver the parameter to the Delivered/Pkg1/InstallPara subnode.

Despite the download mode, it may be necessary to add a storage space in the terminal as a subnode. The existence of the subnode depends on the need of the server. If a parameter (like a serial number) is needed for the installation, or if personalized installation is required (for example, to install only Java related components or only C++ related components), or if it is necessary to provide the server with information of the operating environment of the software components (for example, whether the software component or software component package requires a Java environment or a C++ environment), the terminal may add an InstallPara subnode; otherwise, it is unnecessary to add the InstallPara subnode.

The node information of InstallPara is listed in Table 1. InstallPara is located at DownLoad/<X>/InstallPara, with an optional status and in any format. In this embodiment of the disclosure, the InstallPara subnode is in a character (Chr) format. At most, one InstallPara subnode can be added and the minimum access type is Get. These settings are applicable to all download modes.

TABLE 1

| Status | Tree Occurrence | Format | Min. Access Types |
|---|---|---|---|
| OPTIONAL | Zero or one | Any (such as Chr) | Get |

Table 2 lists the information of a Name subnode. The position of Name is DownLoad/<X>/Name, or Inventory/Delivered/<X>/Name, or Inventory/Deployed/<X>/Name. These settings are applicable to all download modes. This subnode is required in a Chr format. The number of executable nodes that can be added is one. The minimum access type is Get.

TABLE 2

| Status | Tree Occurrence | Format | Min. Access Types |
|---|---|---|---|
| REQUIRED | One | Chr | Get |

In addition, the Pkg1 node includes a State subnode. The position of State is Inventory/Delivered/<X>/State. The information of State is listed in Table 3. The State subnode records state information of the current software component package or software component. The Delivered state may be indicated by "10" and the Installed state may be indicated by "20", as in Table 4.

TABLE 3

| Status | Tree Occurrence | Format | Min. Access Types |
|---|---|---|---|
| REQUIRED | Zero or one | Integer (Int) | Get |

TABLE 4

| State | Integer Value | Description |
|---|---|---|
| Delivered | 10 | Indicates that the package is in the Delivered state. |
| Installed | 20 | Indicates that the package is in the Delivered state. After the package is installed in the Delivered state, the state will change from Delivered to Installed. |

Apparently, the DM server may deliver the parameter after the DM server delivers the command instructing to download and before the terminal installs the software component package.

If the download mode is indirect, the DM server stores the download address of the software component package in the PkgURL subnode of the management node named Pkg1 and delivers the command instructing to download. The terminal may download the software component package to the local in the preset download mode according to the download address.

Step 502: If the terminal receives the download address and the command instructing to download, the terminal downloads the package according to the download address and stores the software component package locally.

Figure 8:
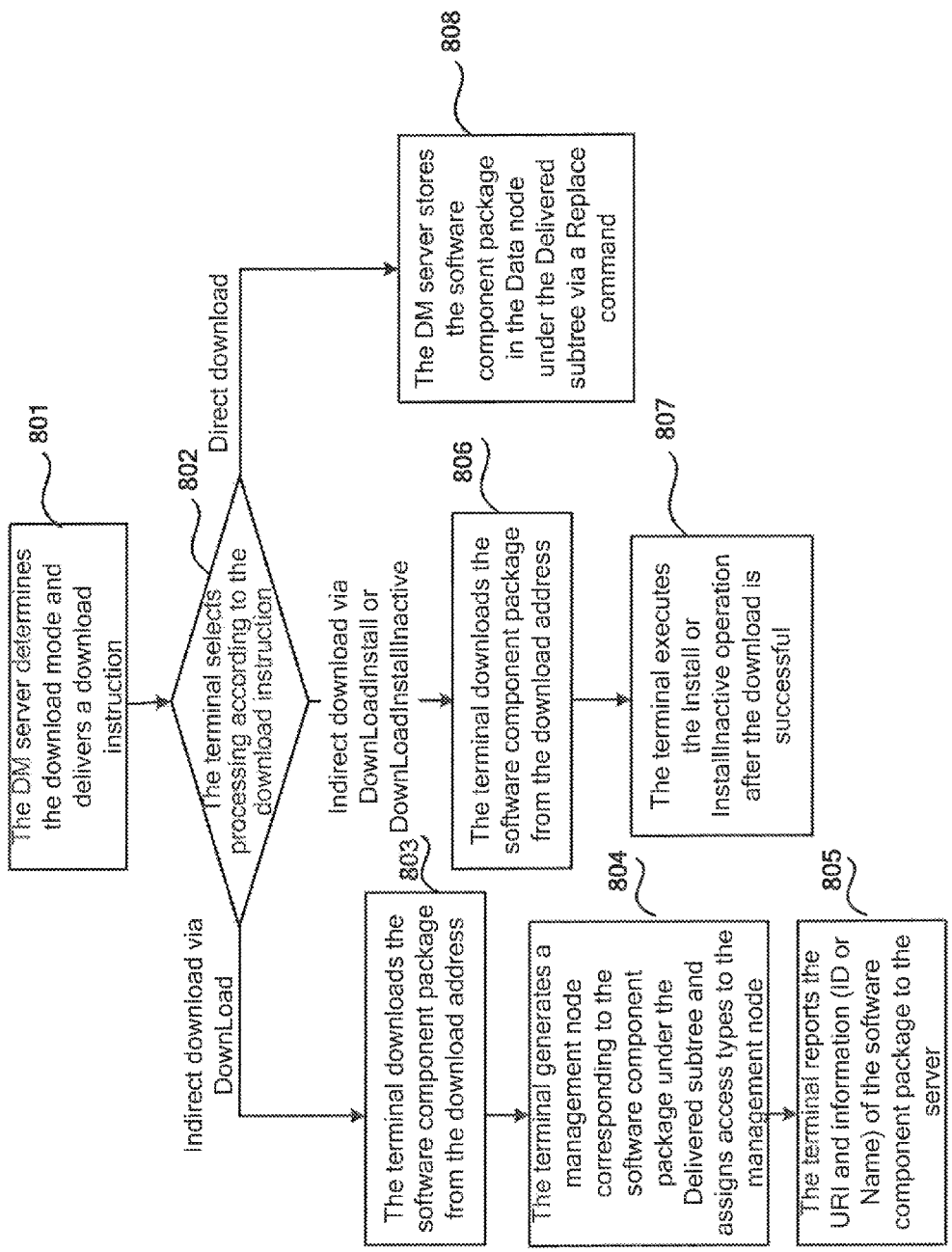
FIG. 8 shows a flowchart of three download modes in the first embodiment of the disclosure.

As described above, the download mode may be direct or indirect. In the direct download mode, the DM server instructs the terminal to generate a management node for the software component package to be downloaded under the Delivered subtree of the SCOMO and execute a Replace command on the Data node of the Delivered subtree so as to deliver the software component package to the terminal. In the indirect mode, the DM server instructs the terminal to generate a management node for the software component package to be downloaded under the Download subnode and set download information, including the software component package name, version, and download address, in the subnodes of the management node and add applicable operation rights; then the DM server delivers the command instructing to download to the terminal. FIG. 8 shows a flowchart of three download modes, including:

Step 801: The DM server determines the download mode and delivers a command instructing to download.

Step 802: The terminal selects processing according to the download instruction. The following describes the three download modes respectively.

1. Indirect download via the Download instruction.

Step 803: The terminal downloads the software component package to the terminal from the download address of the software component package as provided by the DM server.

Step 804: Before installing the software component package, the terminal generates a management node corresponding to the software component package that is successfully downloaded under the Delivered subtree. This means the terminal generates a management node under the Delivered subtree for the software component package. Before generating the management node, the terminal needs to judge whether a management node exists under the Delivered subtree where the PkgID corresponding to this management node is identical with the ID of the downloaded software component package. The PkgID may be provided by a software publisher or a package publisher. If such a management node exists, the terminal modifies information of the management node and its subnodes already existing under the Delivered subtree to information of the currently downloaded software component package and reassigns access control rights to the management node. If such a management node does not exist, the terminal generates a management node and its subnodes for the downloaded software component package under the Delivered subtree and reassigns access control rights to the new management node. In embodiments of the disclosure, assigning access control rights to a node means: generating an Access Control List (ACL) attribute for the node, and assigning a value to the attribute. The value of ACL may be null (to inherit the ACL value of the parent node by default) or non-null (the ACL value of the node itself).

In this embodiment, the ID of the downloaded software component package is PkgID_1. Before the terminal generates the management node corresponding to the software component package, the terminal judges whether a PkgID subnode identified as PkgID_1 exists for the management node under the current Delivered subtree. If such a subnode exists, the terminal modifies information of the existing management node and its subnodes to information of the downloaded software component package and reassigns access control rights to the management node and its subnodes. Otherwise, the terminal generates a new management node for the downloaded software component package under the Delivered subtree, where the value of the PkgID subnode of the new management node is PkgID_1, and assigns access control rights to the new management node and its subnodes. As shown in FIG. 6, the terminal sets a value for each subnode of the management node corresponding to the software component package generated under the Delivered subtree. This value may be the same as the value of the counterpart subnode of the management node corresponding to the software component package generated under the Download subtree. The value of the State subnode is Delivered. In addition, the terminal assigns access control rights and other attribute values to the management node and the subnodes of the management node generated under the Delivered subtree.

In this embodiment, access control rights may be assigned in multiple methods, which are described with examples as follows:

The method for assigning access control rights to a management node under the Delivered subtree is: as described in step 501, when a Download instruction is used, before the DM server delivers the command instructing to download, the terminal has generated a management node corresponding to the software component package under the Download subtree, and therefore the terminal assigns the access control rights of the management node under the Download subtree to the management node generated under the Delivered subtree, or lets the management node under the Delivered subtree inherit the access control rights of its parent node (Delivered node), or assigns specific access control rights (such as Get=*) to the Delivered subtree.

The method for assigning access control rights to a subnode of the management node is: a subnode of the management node under the Delivered subtree inherits access control rights of the management node, or the terminal assigns the access control rights of the counterpart subnode of the management node corresponding to the software component package under the Download subtree to the subnode of the management node under the Delivered subtree. Or, the above two methods may be combined so that part of the subnodes of the management node under the Delivered subtree inherit the access control rights of the management node while the other subnodes of the management node under the Delivered subtree are assigned the access control rights of their counterparts of the management node corresponding to the software component package under the Download subtree.

For executable subnodes of the management node (Install, InstallInactive, and Remove under Operations), the terminal sets the access control rights of counterpart executable nodes under the Download subtree as their access control rights. This means the terminal sets the access control rights of the three executable nodes Install, InstallInactive, and Remove under Operations to the access control rights of the executable nodes under Operations of the management node under the Download subtree, preferably, to the access control rights of the executable node that executes the download operation under the Download subtree. For example, the command instructing to download is DownLoad, the executable node executing the instruction is DownLoad/Pkg1/Operations/DownLoad, and the access control rights are Get=*&Exec=ServerA. Then, the terminal assigns Get=*&Exec=ServerA to all executable nodes under Delivered/Pkg1/Operations.

In addition, if the terminal determines that the downloaded software component package is identical with a software component package corresponding to a management node already existing under the Delivered subtree, the terminal may set the sum of access control rights of the management node for the software component package under the DownLoad subtree and access control rights of the management node for the software component package already existing under the Delivered subtree as the new access control rights of the management node for the software component package under the Delivered subtree. For the subnodes of the management node, access control rights may be assigned in the same method as above.

Step 805: The terminal reports a download response message to the DM server. The message carries the URI of the software component package in the Delivered subtree (the URI of a subnode of Delivered). The message may also carry other information, including but not limited to one or more of the following items: software component package ID (the PkgID subnode) and the software component package name (the Name subnode).

In this embodiment, the response message may be reported in multiple modes such as synchronous reporting and asynchronous reporting. Synchronous reporting means the terminal reports the execution result and other information in the response to the operation instruction delivered by the server; asynchronous reporting means the terminal reports the execution result independently of the response to the operation instruction delivered by the server in a same or different management session. With synchronous reporting, the server is aware of the current execution result of the terminal in real time while asynchronous reporting helps shorten the session waiting duration between the terminal and the server with less resource waste and higher efficiency. The user may choose a proper reporting mode based on actual needs. The two reporting modes are described as follows:

Asynchronous reporting realizes reporting of data by using the Generic Alert command. Information reported includes the Result Code, Source, Target, AlertType, and Correlator, where the Result Code is carried in the Item/Data element of the Generic Alert command. The Source element carries the URI of the node executing the download instruction. The Target element carries the URI of the management node generated for the software component package under the Delivered subtree. In addition to the above information, information of the software component package is also reported, such as name information which is the Name subnode of the management node generated under the Delivered subtree and/or the ID information which is the PkgID subnode of the management node generated under the Delivered subtree. There are at least three specific methods for reporting information of the component package:

1. Report the name of the package to the DM server via the extendable element EMI of the MetaInf in the Alert. This may be implemented using the following program, where Pkg1 is the name assigned to the management node when the node is generated by the terminal:

```
<Alert>
    <CmdID>2</CmdID>
    <Data>1226</Data> <!-- Generic Alert -->
    <Correlator>abc123</Correlator>
    <Item>
  <Source><LocURI>./SCOMO/Download/Pkg1/Operations/
Download</LocURI></Source>
    <Target><LocURI>./SCOMO/Inventory/Delivered/
Pkg1</LocURI></Target>
        <Meta>
            <Type xmlns="syncml:metinf">
   org.openmobilealliance.softwarecomponent.OperationComplete
            </Type>
            <Format xmlns="syncml:metinf"> text/plain
            </Format>
            <Mark xmlns="syncml:metinf">critical</Mark>
            <EMI xmlns="syncml:metinf" > _Name</EMI>
<!-- package information to be reported -->
        </Meta>
        <Data>
            <!-- Result Code -->
        </Data>
    </Item>
</Alert>
```

In the above program, the value of Experimental Meta Information (EMI) may be information in Delivered/Pkg1/Name or Delivered/Pkg1/PkgID, or both.

2. Add an Item element in the Alert and report the software component package information to the DM server via a Data element of the added Item. This may be implemented via the following program:

```
<Alert>
    <CmdID>2</CmdID>
    <Data>1226</Data> <!-- Generic Alert -->
    <Correlator>abc123</Correlator>
    <Item>
  <Source><LocURI>./SCOMO/Download/Pkg1/Operations/
Download</LocURI></Source>
    <Target><LocURI>./SCOMO/Inventory/Delivered/Pkg1</
LocURI></Target>
        <Meta>
            <Type xmlns="syncml:metinf">
                org.openmobilealliance.softwarecomponent.
                OperationComplete
            </Type>
            <Format xmlns="syncml:metinf">text/plain</Format>
            <Mark xmlns="syncml:metinf">critical</Mark>
        </Meta>
        <Data>
            <!-- Result Code -->
        </Data>
    </Item>
    <Item>
  <Source><LocURI>./SCOMO/Download/Pkg1/Operations/
Download</LocURI><Source>
<Target><LocURI>./SCOMO/Inventory/Delivered/Pkg1/Name</
LocURI></Target>
        <Meta>
          <Type xmlns="syncml:metinf">
            org.openmobilealliance.softwarecomponent.
            OperationComplete
          </Type>
            <Format xmlns="syncml:metinf">chr</Format>
        </Meta>
        <Data>_Name</Data> <!-- package
        information to be reported -->
    </Item>
</Alert>
```

In the above program, the value of Data may be information in Delivered/Pkg1/Name or Delivered/Pkg1/PkgID, or both.

3. Report the Result Code in the Item/Data element of the Alert, together with the ID and/or Name. To help the server correctly resolve the Result Code, ID and/or Name in the Item/Data element, it is necessary to define a data format for the Item/Data element. The format may be "Result Code (separator)ID" or the Extendable Markup Language (XML) format. A section of the specific reporting program (in the XML format) is as follows, where Pkg1 is the name assigned to the management node when the node is generated by the terminal:

```
<Alert>
    <CmdID>2</CmdID>
    <Data>1226</Data> <!-- Generic Alert -->
    <Correlator>abc123</Correlator>
    <Item>
    <Source><LocURI>./SCOMO/Download/Pkg1/Operations/Download</LocURI></Source>
    <Target><LocURI>./SCOMO/Inventory/Delivered/Pkg1</LocURI></Target>
        <Meta>
            <Type xmlns="syncml:metinf">
    org.openmobilealliance.softwarecomponent.OperationComplete
            </Type>
            <Format xmlns="syncml:metinf">text/plain
            </Format>
            <Mark xmlns="syncml:metinf">critical</Mark>
        </Meta>
        <Data>
            <![CDATA[
                <ResultCode>200</ResultCode>
                <Identifier>1123sdf312</Identifier>
            ]]>
        </Data>
    </Item>
</Alert>
```

In synchronous reporting, the operation result is reported via a Status command corresponding to the Exec command. The Data element of the Status command carries the DM status code of the operation. The Status command also reports the URI of the Pkg1 management node under the Delivered subtree. It may also report the Name or PkgID of the software component package. The reporting method is: the Status command carries an Item, the Target element of the Item carries the URI of the Pkg1 management node under the Delivered subtree, and the Source element carries the URI of the node executing the Exec operation. The reporting may be implemented via the following program:

```
<Status>
<MsgRef>1</MsgRef>
<CmdRef>2</CmdRef>
<Cmd>Exec</Cmd>
<Data>200</Data> <!-- Successful -->
<Item>
<Target>
<LocURI>./SCOMO/Inventory/Delivered/Pkg1</LocURI>
</Target>
</Item>
</Status>
```

In addition to the execution status, the Delivered/Pkg1/NAME or Delivered/Pkg1/PkgID and the package operation status code may be reported at the same time. The software component package operation code may be carried in the Item/Data element and the Delivered/Pkg1/NAME or Delivered/Pkg1/PkgID may be carried in the EMI element or a parallel item, or combined in the Item/Data element (if the software component operation code is also to be reported, the status code is also combined). For combined reporting, to help the server correctly resolve different data in the Item/Data element, it is necessary to define a data format for the Item/Data element. The format may be "result code(separator)ID" or the XML format. The specific reporting program segment (in the XML format) is as follows:

```
<Status>
<MsgRef>1</MsgRef>
<CmdRef>2</CmdRef>
<Cmd>Exec</Cmd>
<Data>200</Data> <!-- Successful -->
<Item>
    <Target>
<LocURI>./SCOMO/Inventory/Delivered /Pkg1</LocURI>
</Target>
<Meta><Format xmlns="syncml:metinf"> text/plain </Format></Meta>
<Data>
            <![CDATA[
                <ResultCode>200</ResultCode>
                <!-Status Code -->
                <Identifier>1123sdf312</Identifier>
        ]]>
</Data>
</Item>
</Status>
```

The DM server determines the downloaded software component package and the corresponding management node according to the information reported by the terminal. Based on the information, the terminal may carry out subsequent operations on the software component package.

2. Indirect download via the DownLoadInstall or DownLoadInstallInactive instruction.

In this download mode, the DM server also instructs the terminal to generate a management node for the software component package under the Download subtree. Then step 806 follows: the terminal downloads the software component package to the local from the download address provided by the DM server. The download address is stored in the PkgURL subnode of the management node under the Download subtree. Then step 807 follows: if the download is successful, the terminal executes the Install or InstallInactive operation automatically after the download is complete.

3. Direct download.

Step 808: The DM server instructs the terminal to generate a management node for the software component package under the Delivered subtree and delivers a Replace command targeted at the Data subnode of the management node generated under the Delivered subtree to the terminal. The terminal receives the software component package data delivered by the server via the Replace command and stores the data in the Data subnode of the management node under the Delivered subtree, and returns a download response message to the DM server.

Step 503: The terminal installs the downloaded software component package locally and generates management nodes corresponding to the software components in the package as well as subnodes of the management nodes under the Deployed subtree of the SCOMO.

When the download is complete, the terminal installs the obtained software component package locally. Apparently, if the download is direct, the obtained software component package is delivered directly by the DM server; if the download, is indirect, the software component package is obtained from the download address delivered by the DM server.

The installation mode varies with the download mode. The following describes the respective installation processes in the case of direct download, indirect download via DownLoad, and indirect download via DownLoadInstall and DownLoadInstallInactive.

1. Indirect download via DownLoadInstall or DownLoadInstallInactive.

If the DM server delivers the DownLoadInstall or DownLoadInstallInactive instruction, the terminal installs the software component package directly after the software component package is successfully downloaded. Step 502 describes the process where the terminal downloads the software component package via a DownLoadInstall or DownLoadInstallInactive instruction. In this case, the terminal may generate a management node for the downloaded software component package under the Delivered subtree as shown in FIG. 6 and assign access control rights to the management node and its subnodes. Here, the access control rights may be assigned in the same way as described in step 502 for assigning access control rights to the management node generated under the Delivered subtree when the DownLoad instruction is delivered. Alternatively, the terminal may not generate the corresponding management node under the Delivered subtree.

The terminal installs the downloaded software component package locally, and a parameter may be required in the installation process. One parameter delivery method is described in step 501. In embodiments of the disclosure, other methods may be used for the terminal to obtain the parameter. For example, if the DM server sets the download mode to direct download or indirect download via DownLoad command, when the DM server receives the download response message from the terminal, the DM server thinks that the terminal has successfully downloaded the software component package and sends the Install or InstallInactive instruction, and the DM server delivers the parameter to the terminal via the Install or InstallInactive instruction. If the DM server sets the download mode to indirect download via DownLoadInstall or DownLoadInstallInactive command, the DM server delivers the parameter to the terminal via the DownLoadInstall or DownLoadInstallInactive instruction command. This actually means the parameter is delivered via a DM command that includes the Install command. For example, when the Inventory/Delivered/<Pkg1>/Operations/Install subnode executes the operation, the DM server delivers the install instruction to specify the Inventory/Delivered/<Pkg1>/Operations/Install executable node to execute the installation operation. In this case, the parameter is delivered via the following program:

```
<Exec>
    <CmdID>3</CmdID>
    <Item>
        <Target>
            <LocURI>./SCOMO/Inventory/Delivered/Pkg1/Operations/
            Install</LocURI>
        </Target>
        <Data>-1 -t</Data> <!-- Parameter -->
    </Item>
</Exec>
```

In the above program, the parameter is carried in the Data element of the Exec command. During the installation process, the terminal can execute the installation according to this parameter.

When the installation is executed via DownLoadInstall or DownLoadInstallInactive, if the installation fails but the software component package is not removed, and the terminal does not generate a management node corresponding to the software component package under the Delivered subtree before the installation, the terminal generates a management node for the downloaded software component package under the Delivered subtree. Before generating the management node, the terminal needs to judge whether a management node corresponding to a software component package identical with the downloaded software component package already exists under the current Delivered subtree. If such a management node exists, the terminal modifies information of the management node and its subnodes under the current Delivered subtree to information of the downloaded software component package and assigns access control rights to the updated management node and subnodes. Otherwise, the terminal generates a new management node for the downloaded software component package and its subnodes under the Delivered subtree and assigns access control rights to the new management node and subnodes. Here, the access control rights may be assigned in a same way as described in step 502 when the terminal downloads the software component package via the Download instruction. The assignment method, however, is not limited to this. Afterwards, the terminal reports an installation response message that carries failure information to the DM server.

If the installation is successful, the terminal needs to generate a management node for each software component in the software component package under the Deployed subtree. As shown in FIG. 6, when the terminal generates a management node for a software component in the software component package, the terminal obtains the ID of the software component and sets the ID as the value of the software component ID subnode of the management node (that is, as the value of the ID node under the Deployed subtree). The software component ID may be provided by the network, for example, a software publisher or a software component package publisher. The component ID may be delivered to the terminal together with the software component package as metadata of the software component package, or delivered to the terminal independently of the software component package. The software component ID may uniquely identify a software component. The server (a DM server, or a software publisher, or a package publisher) may recognize a software component according to this ID. Before generating the management node, the terminal needs to judge whether one or more software components corresponding to the management node already existing under the Deployed subtree are the same as one or more of the installed software components. The judgment may be performed in this way: compare software component IDs (the ID node under the Deployed subtree) or software component names (the Name node under the Deployed subtree). If IDs are taken as the judgment criterion, when the IDs of two software components are the same, the two software components are regarded as the same. Otherwise, the software components are different. The same applies when names are taken as the judgment criterion. If two software components are identical, when the terminal modifies information of the management node of the existing software component and its subnodes, the terminal does not change the value of the existing PkgIDRef subnode (that is retains the association between the old software component corresponding to the management node and the old software component package, the value of which is the PkgID of the old software component package) and adds a new association (that is, adds a PkgIDRef node under the Deployed subtree for storing the association between the installed software component package and the software component in the software component package corresponding to the management node). Thus, multiple PkgIDRef nodes may coexist under the Deployed subtree. To realize this capability, it is necessary to change the tree occurrence of PkgIDRef nodes that store association information to "one or more", as described in Table 5.

TABLE 5

| Status | Tree Occurrence | Format | Min. Access Types |
|---|---|---|---|
| REQUIRED | One or more | Chr | Get |

The following judgment process takes names as the judgment criterion.

Figure 9:
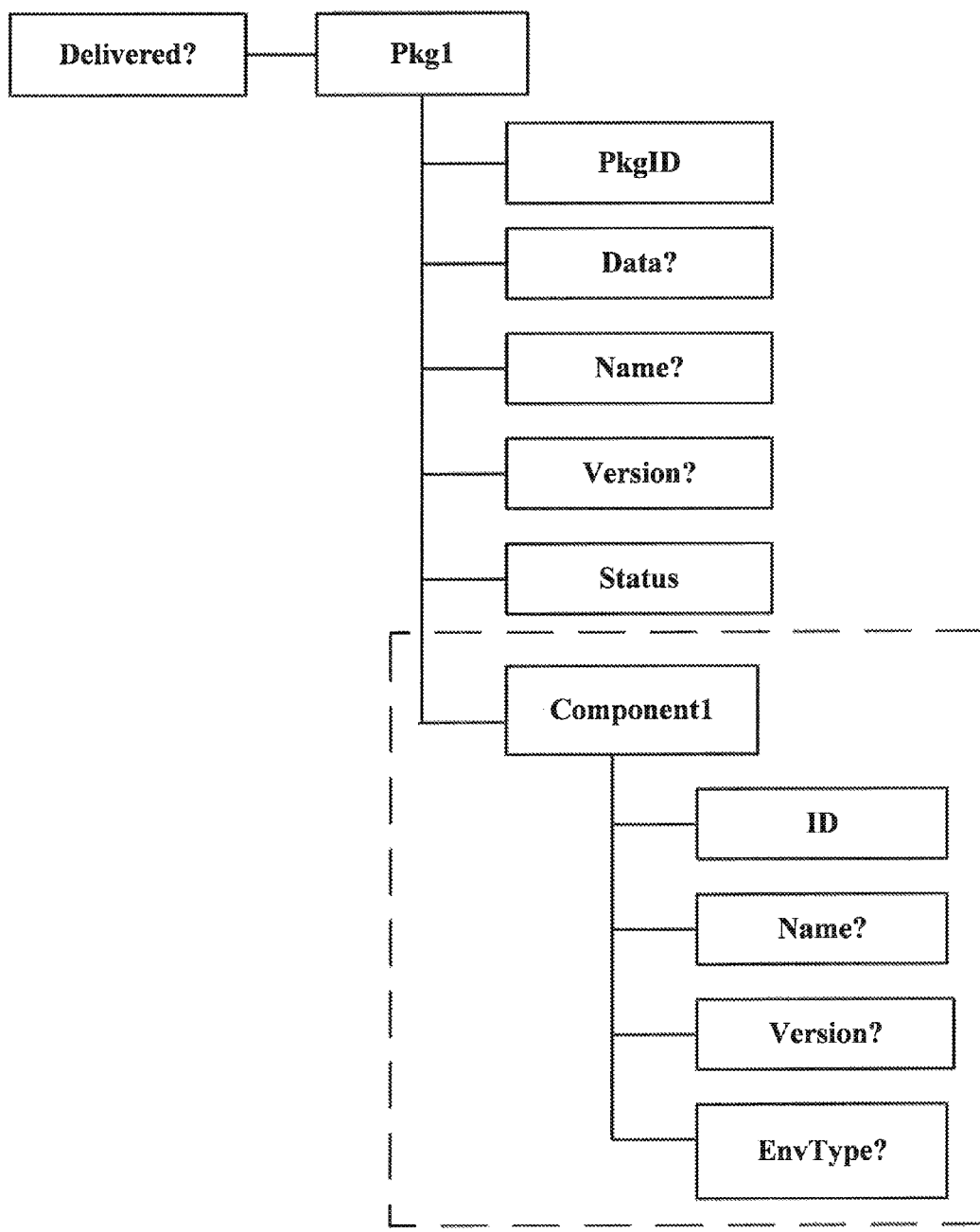
FIG. 9 shows a structure of a SCOMO where a Pkg1 management node generated under the Download subtree includes information of software components.

Take a software component named ascendo_1 for example. If the value of the Name subnode of a management node under the Deployed subtree is ascendo_1, the terminal modifies the information of the management node to the information of the ascendo_1 software component that is downloaded and installed successfully and assigns access control rights to the updated management node and its subnodes. If the value of the Name subnode of no management node under the Deployed subtree is ascendo_1, the terminal generates a management node named software component 1 under the Deployed subtree, of which the Name subnode value is ascendo_1, and assigns access control rights to the management node and its subnodes. The management node named software component 1 may be generated under the Deployed subtree in multiple modes. For example, if the management node generated under the Download subtree includes information of the software component, as shown in FIG. 9, the terminal stores the software component information in the corresponding management node under the Deployed subtree.

Here, no matter whether the terminal judges that the same software component already exists, it is necessary to assign access control rights to the updated or generated management node and its subnodes. The access control rights may be assigned in multiple methods, such as the method described in step 502. In addition, if the terminal judges that a management node of the same name exists, still other assignment methods may be applied. For example, combine a set access control right with the access control rights of the existing management node and use the combined access control rights as the new access control rights, where the set access control right may be that of the software component package under the Download subtree. An example of assigning access control rights to a specific executable node is as follows: the Download/Pkg1/Operations/DownloadInstall node executes the installation operation, the access control rights of Download/Pkg1 are Get=ServerA&Relace=ServerA and the access control rights of Download/Pkg1/Operations/DownloadInstall are Get=ServerA&Exec=ServerA. Currently, the access control rights of the management node generated for the same software component under the Deployed subtree are Get=ServerB&Relace=ServerB. The access control rights of all executable nodes under Operations are Get=ServerB&Exec=ServerB. After the terminal updates the management node information of the same component under the Deployed subtree, the terminal may set ServerA as a new server with the access and management right; or the terminal may set Get=ServerA+ServerB&Relace=ServerA+ServerB as the access control rights of the new management node; or the terminal may set the access control rights to a null ACL so that the management node inherits the access control rights of its parent node; or the terminal may set specific access control rights such as Get=*.

The method for assigning access control rights to a subnode of the management node is: the subnode inherits the access control rights of the management node, or the terminal assigns the access control rights of the counterpart subnode of the management node corresponding to the software component package under the Download subtree to the subnode of the management node under the Deployed subtree, or the terminal sets the access control rights of the Download subtree as the access control rights of the executable subnodes of the management node under the Deployed subtree, that is, sets the access control rights of the three executable subnodes Activated, Deactivated and Remove of Operations under the Deployed subtree to the access control rights of the executable subnodes (Download, DownLoadInstall, and DownLoadInstallInactive) under Operations of the management node under the Download subtree, and preferably, to the access control rights of the executable subnode that executes the installation operation under the Download subtree. For example, if the installation command is DownLoadInstall, the executable node executing the command is Download/Pkg1/Operations/DownloadInstall, and the access control rights are Get=*&Exec=ServerA. Then, the terminal assigns Get=*&Exec=ServerA to all executable nodes under Delivered/Pkg1/Operations.

This combination of access control rights enables ServerB to operate on the management node after the management node is updated, which, however, may weaken the security. The user may choose a proper method for assigning access control rights based on actual needs.

No matter whether the installation is successful, the terminal needs to report an installation response message to the DM server. The difference is that, if the installation fails, the terminal also needs to report a failure message to the DM server. The reporting mode may be synchronous or asynchronous. If asynchronous, the terminal sends a Generic Alert. Information reported via asynchronous reporting includes the Result Code, Source, AlertType, and Correlator, where the Result Code is carried in the Item/Data element of the Generic Alert. The Source element carries the URI of the node executing the installation instruction. If the installation is successful, the Target element needs to carry the URI of the corresponding management node under the Deployed subtree; if the download succeeds but the installation fails (Result Code: 60) and the corresponding management node is generated under the Delivered subtree, the Target element also needs to carry the URI of the management node generated under the Delivered subtree. In addition, the information reported may also carry the names or IDs of the software components. The name or ID is reported in a same method as described in step 502 where the terminal reports the download response message when the download is executed via a DownLoad instruction.

If the reporting is synchronous, the terminal reports the execution result via a Status command corresponding to the Exec command. The Data element of the Status command carries the DM status code of the operation. If the installation is successful, the Status command needs to carry the URI of the management node generated under the Deployed subtree and may also carry the Name and/or PkgID of the software component package. Specifically, the Status command carries an item, of which the Target element carries the URI of the management node generated under the inventory/Deployed subtree. The Status command may also carry the software component information (Name or ID) and/or software component operation status code together with the execution result. The name or ID information under the Inventory/Deployed subtree may be carried in an EMI element or in a parallel Item, or combined in the data of the Item/Data element (the status code is also combined if the software component operation status code needs to be reported). The software component operation status code is carried in the Data element. The synchronous reporting is similar to the synchronous reporting in step 502. For the specific code examples, see the codes in synchronous reporting in step 502.

Apparently, if the DM server does not deliver the parameter, other steps of this embodiment may still be carried out normally. After the DM server receives the reported information, the terminal may proceed with subsequent operations on the software components according to the information.

2. Direct download or indirect download via DownLoad.

After the software component package is downloaded in the direct download mode or in the indirect mode via DownLoad, the terminal sends a download response message to the server. Upon reception of the download response message, the DM server delivers an installation instruction, Install or InstallInactive, to the terminal. The executable node executing the installation operation is Inventory/Delivered/<Pkg1>/Operations/Install or Inventory/Delivered/<Pkg1>/Operations/InstallInactive. Even, the installation instruction may be sent via the operating interface to the executable node that executes the installation operation. Before executing the installation, the terminal needs to judge whether the DM server that delivers the installation instruction has to the right to operate on the software component package. This means the terminal judges whether the DM server has the right to access and manage the Inventory/Delivered/<Pkg1>/Operations/Install or Inventory/Delivered/<Pkg1>/Operations/InstallInactive executable node. If the package is downloaded directly, the access control rights of the Inventory/Delivered/<Pkg1>/Operations/Install or Inventory/Delivered/<Pkg1>/Operations/InstallInactive executable node are assigned by the DM server that delivers the download instruction. If the download instruction is Download, the access control rights of the Inventory/Delivered/<Pkg1>/Operations/Install or Inventory/Delivered/<Pkg1>/Operations/InstallInactive executable node are assigned by the terminal.

If the DM server meets the right requirement, which means the DM server has the right to access and manage the executable node, after the installation is complete, the terminal server generates management nodes corresponding to the software components named ascendo_1, ascendo_2 and ascendo_3 under the Deployed subtree, as shown in FIG. 6 or 7. When the terminal generates a management node for a software component in the software component package, the terminal obtains the ID of the software component and sets the ID as the value of the software component ID subnode of the management node (the value of the ID node under the Deployed subtree.) The software component ID may be provided by the network, for example a software publisher or a software component package publisher. The software component ID may be delivered to the terminal together with the software component package as metadata of the software component package, or delivered to the terminal independently of the software component package. The software component ID may uniquely identify a software component. The server (a DM server, or a software publisher, or a software component package publisher) may recognize a software component according to this ID. Before the terminal generates management nodes for the three software components, if the terminal determines that the management nodes corresponding to three same software components do not exist under the Deployed subtree, the terminal generates the management nodes corresponding to the ascendo_1, ascendo_2, and ascendo_3 software components under the Deployed subtree. If such management nodes exist, the terminal modifies information of the management nodes and their subnodes to information of the software components. When the terminal modifies information of the management node and its subnodes of a software component, the terminal retains the value of the existing PkgIDRef subnode (it retains the association between the old software component corresponding to the management node and the old software component package, the value of which is the PkgID of the old software component package) and adds a new association (it adds a PkgIDRef node under the Deployed subtree for storing the association between the installed software component package and the software component in the software component package corresponding to the management node). Thus, multiple PkgIDRef nodes may exist under the Deployed subtree. Whatever the judgment result is, the terminal assigns access control rights to the updated or newly generated management node and subnodes of the management node. The assignment method here may the same as the method used in the foregoing indirect download mode via DownLoadInstall or DownLoadInstallInactive.

Accordingly, when the terminal reports an installation response message to the DM server, the reporting mode may also be synchronous or asynchronous. In the case of asynchronous reporting, the response message is sent via a Generic Alert and the information reported includes the Result Code, Source, Target, AlertType, and Name, where the Result Code is carried in the Item/Data element of the Generic Alert. The Source element carries the URI of the node executing the installation instruction. The Target element carries the URI of the Deployed subtree after the software component is installed. In addition to the above information, the response message also needs to carry the name or ID of the software component. How the name or ID is reported is the same as in step 502 when the download response message is reported in the case of download via DownLoad. The DM server determines an installed software component and the corresponding management tree according to the information reported by the terminal. Based on the information, the terminal may carry out subsequent management operations on the software component.

If the reporting is synchronous, the terminal reports the execution result via a Status command corresponding to the Exec command. The Data element of the Status command carries the DM status code of the operation. The terminal also reports the information of the management node under the Deployed subtree, including the URI of the management node for the software component, the software component ID (ID node under the Deployed subtree) and/or the software component name (Name node under the Deployed subtree). The reporting method is as follows: the Status command carries an Item, of which the Target element carries the URI of the management node for the installed software component, or the software component information (Name or ID) and/or the software component operation status code may be carried when the status is reported. The name or ID information of the management node under the Deployed subtree may be carried in an EMI element or in a parallel Item, or combined in the data of the Item/Data element (the status code is also combined if the software component operation status code needs to be reported). The software component operation status code is carried in the Data element. The synchronous reporting is similar to the synchronous reporting in step 502. For the specific code examples, see the codes in synchronous reporting in step 502.

No matter whether the reporting mode is synchronous or asynchronous, after the terminal executes the DownLoadInstall or DownLoadInstallInactive operation and generates the software component management node and its subnodes under the Deployed subtree, if the terminal also generates a management node corresponding to the software component package under the Delivered subtree of the SCOMO, the installation response message includes the URI of the management node generated under the Deployed subtree and URI of the management node generated under the Delivered subtree. The server judges whether a URI indicates the address of the software component package in the SCOMO tree or the address of an installed software component in the SCOMO tree according to the URI carried in the Item/Data element of the message reported. The specific judgment method is the server checks whether the URI includes a Delivered or Deployed string and if a Delivered string is included, the URI indicates the address of the package in the SCOMO tree; otherwise, the URI indicates the address of the installed software component in the SCOMO tree. The following is an example of a message reported asynchronously:

```
<Alert>
    <CmdID>2</CmdID>
    <Data>1226</Data> <!-- Generic Alert -->
    <Correlator>abc123</Correlator>
    <Item>
<Source><LocURI>./SCOMO/Download/Pkg1/Operations/
DownloadInstall</LocURI></Source>
    <Target><LocURI>./SCOMO/Inventory/Delivered/Pkg1</
LocURI></Target>
        <Meta>
            <Type xmlns="syncml:metinf">
                org.openmobilealliance.softwarecomponent.
                OperationComplete
            </Type>
            <Format xmlns="syncml:metinf">text/plain</Format>
        </Meta>
        <Data>...</Data>
    </Item>
    <Item>
<Source><LocURI>./SCOMO/Download/Pkg1/Operations/
DownloadInstall</LocURI><Source>    <Target><LocURI>./
SCOMO/Inventory/Deployed/Com1 </LocURI></Target>
        <Meta>
            <Type xmlns="syncml:metinf">
                org.openmobilealliance.softwarecomponent.
                OperationComplete
            </Type>
            <Format xmlns="syncml:metinf">chr</Format>
        </Meta>
        <Data> ... </Data>
    </Item>
</Alert>
```

In this embodiment of the disclosure, this process may be an installation process based on a parameter. Despite the presence of a parameter, other installation steps are not impacted. After the installation is complete, the Remove executable node may be called to remove the installed component.

Figure 10:
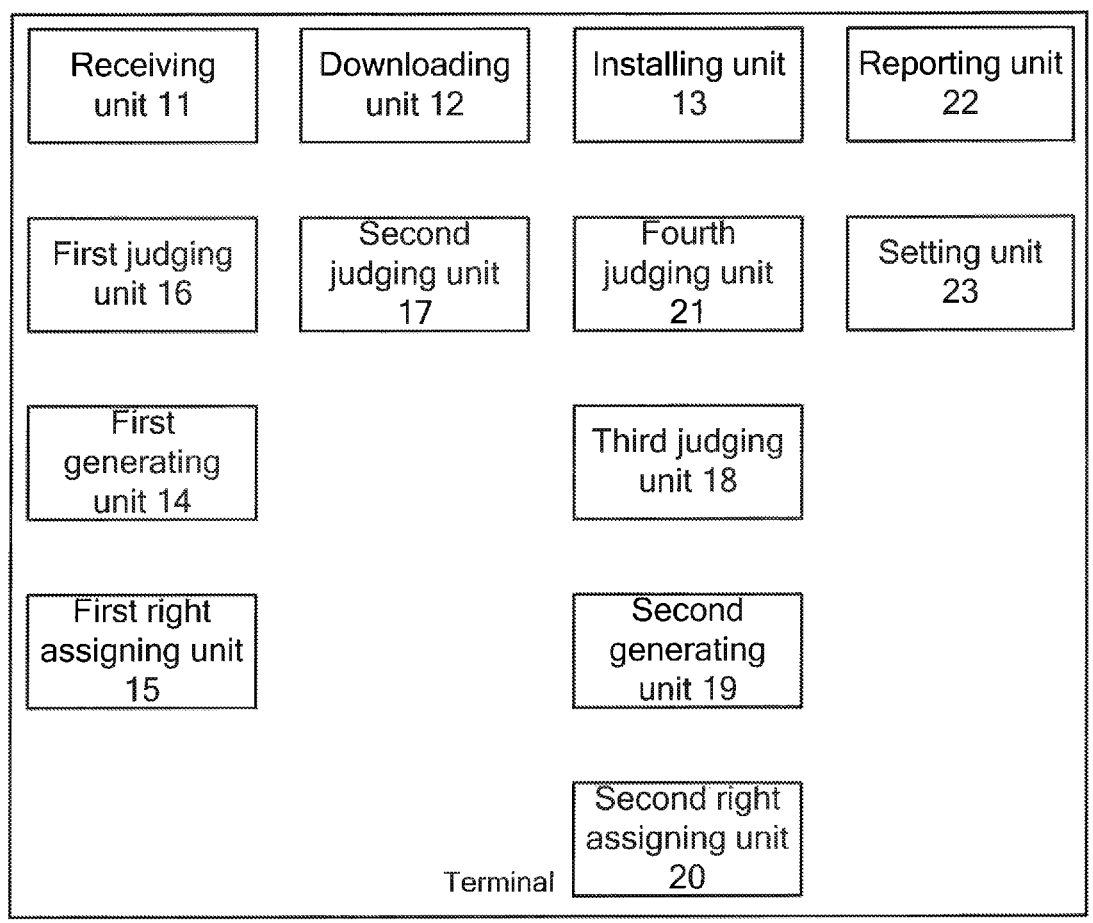
FIG. 10 shows a structure of a terminal in an embodiment of the present disclosure.

A terminal provided in an embodiment of the disclosure, as shown in FIG. 10, includes a receiving unit 11, a downloading unit 12, and an installing unit 13. The receiving unit 11 is adapted to receive a software component package or a download address of the software component package and a command instructing to download delivered by a DM server, where the software component package contains more than one software component. The downloading unit 12 is adapted to download the software component package according to the download address if the receiving unit 11 receives the download address and the command instructing to download. The installing unit 13 is adapted to install the obtained software component package locally and generate management nodes corresponding to the software components and their subnodes under the Deployed subtree.

If the command instructing to download is DownLoad, after the software component package is downloaded and before the software component package is installed, or if the command instructing to download is DownLoadInstall or DownLoadInstallInactive, if the download is successful but the installation fails, the terminal further includes a first generating unit 14 and a first right assigning unit 15. The first generating unit 14 is adapted to generate a management node corresponding to the software component package under the Delivered subtree; the first right assigning unit 15 is adapted to assign access control rights to the management node and subnodes of the management node.

Before the management node corresponding to the software component package is generated under the Delivered subtree, the terminal further includes a first judging unit 16, adapted to judge whether the ID of the downloaded software component package is identical with the ID of a software component package corresponding to a management node already existing under the Delivered subtree, and if so, modify information of the management node under the Delivered subtree to information of the downloaded software component package; otherwise, generate a management node corresponding to the downloaded software component package under the Delivered subtree.

Before receiving information, the receiving unit 11 is further adapted to generate a management node for the software component package under the Download subtree; the first right assigning unit 15 is further adapted to set access control rights of the management node generated under the Download subtree as access control rights of the management node generated under the Delivered subtree, or set access control rights of the management node generated under the Delivered subtree to null so that the management node inherits access control rights of its parent node, or set specific access control rights for the management node generated under the Delivered subtree, or combine access control rights of the management node generated under the Download subtree and access control rights of the parent node of the management node generated under the Delivered subtree and set the combined access control rights as access control rights of the management node generated under the Delivered subtree.

Before receiving information, the receiving unit 11 is further adapted to generate a management node for the software component package under the Download subtree; when the first judging unit 16 judges that the downloaded software component package is identical with a software component package corresponding to a management node already existing under the Delivered subtree, the first right assigning unit 15 is further adapted to set a sum of access control rights of the management node generated under the Download subtree and access control rights of the management node already existing under the Delivered subtree as access control rights of the management node under the Delivered subtree.

The first right assigning unit 15 is also adapted to let subnodes of the management node generated under the Delivered subtree inherit the access control rights of the management node, or set access control rights of an executable node under the Download subtree as access control rights of an executable node of the management node generated under the Delivered subtree.

After the downloading unit 12 downloads the software component package, the receiving unit 11 is further adapted to receive a DM command delivered by the DM server for a Delivered subtree node and judge whether the DM server has the right to execute the DM command on the node according to the access control rights assigned to the node, and if the DM server has the right, execute the DM command on the node; the terminal further includes a second judging unit 17, adapted to judge whether the DM server has the right to access and control the node generated under the Delivered subtree to be operated by the DM command and if so, execute the DM command on the node.

The receiving unit 11 is further adapted to receive a parameter delivered by the DM server; the installing unit 13 is further adapted to install the downloaded software component package locally according to the parameter.

After the installing unit 13 executes the installation and before management nodes corresponding to the software components are generated under the Deployed subtree, the terminal further includes a third judging unit 18, adapted to judge whether one software component in the software component package is identical with a software component corresponding to a management node already existing under the Deployed subtree and if so, modify information of the management node under the Deployed subtree to information of the software component in the software component package; otherwise, generate a management node corresponding to the software component in the software component package under the Deployed subtree.

Before receiving the software component package delivered by the DM server directly via the DM command, the receiving unit 11 is further adapted to generate a management node corresponding to the software component package under the Delivered subtree according to the instruction of the DM server, where the management node includes software component information; the terminal further includes a second generating unit 19, adapted to store the software component information included in the management node under the Delivered subtree to the Deployed subtree.

After the management nodes corresponding to the software components are generated under the Deployed subtree, the terminal further includes a second right assigning unit 20, adapted to assign access control rights to the management nodes and their subnodes.

The second right assigning unit 20 is also adapted to set access control rights of the management node corresponding to the software component package generated under the Delivered or Download subtree as access control rights of the management nodes generated under the Deployed subtree, or set the access control rights of the management nodes generated under the Deployed subtree to null so that the management nodes inherit the access control rights of their parent nodes, or set specific access control rights for the management nodes generated under the Deployed subtree, or combine access control rights of the management node under the Delivered or Download subtree and access control rights of the parent nodes of the management nodes generated under the Deployed subtree and set the combined access control rights as the access control rights of the management nodes generated under the Deployed subtree.

The second right assigning unit 20 is also adapted to let subnodes of a management node generated under the Deployed subtree inherit access control rights of the management node, or set access control rights of an executable node under the Delivered or Download subtree as access control rights of an executable node of the management node generated under the Deployed subtree.

After the management nodes corresponding to the software components are generated under the Deployed subtree, the receiving unit 11 is further adapted to receive a DM command delivered by the DM server for a Deployed subtree node and judge whether the DM server has the right to execute the DM command on the node according to the access control rights assigned to the node, and if the DM server has the right, execute the DM command on the node; the terminal further includes a fourth judging unit 21, adapted to judge whether the DM server has the right to access and manage the node generated under the Deployed subtree to be operated by the DM command and if so, execute the DM command on the node.

If the command instructing to download carries DownLoad as an indirect download instruction, after the download is successful and before the software component package is installed, the terminal further includes a reporting unit 22, adapted to report a download response message to the DM server, where the download response message includes the URI of the management node generated under the Delivered subtree. After the management nodes corresponding to the software components are generated under the Deployed subtree of the SCOMO, the reporting unit 22 is further adapted to report an installation response message to the DM server, where the installation response message includes URIs of the management nodes generated under the Deployed subtree.

The download response message and the installation response message are reported in a synchronous or asynchronous mode.

If the reporting mode is synchronous, the reporting unit 22 is further adapted to carry the URI in the download response message or the installation response message via the Target sub-element of an Item element of a Status command.

The download response message further includes a name and/or ID) of the software component package; the installation response message further includes names and/or IDs of the software components.

If DownLoad is used to indicate direct or indirect download, after generating the management nodes corresponding to the software components under the Deployed subtree, the terminal further includes a setting unit 23, adapted to set the state of the software component package to Installed.

Figure 11:
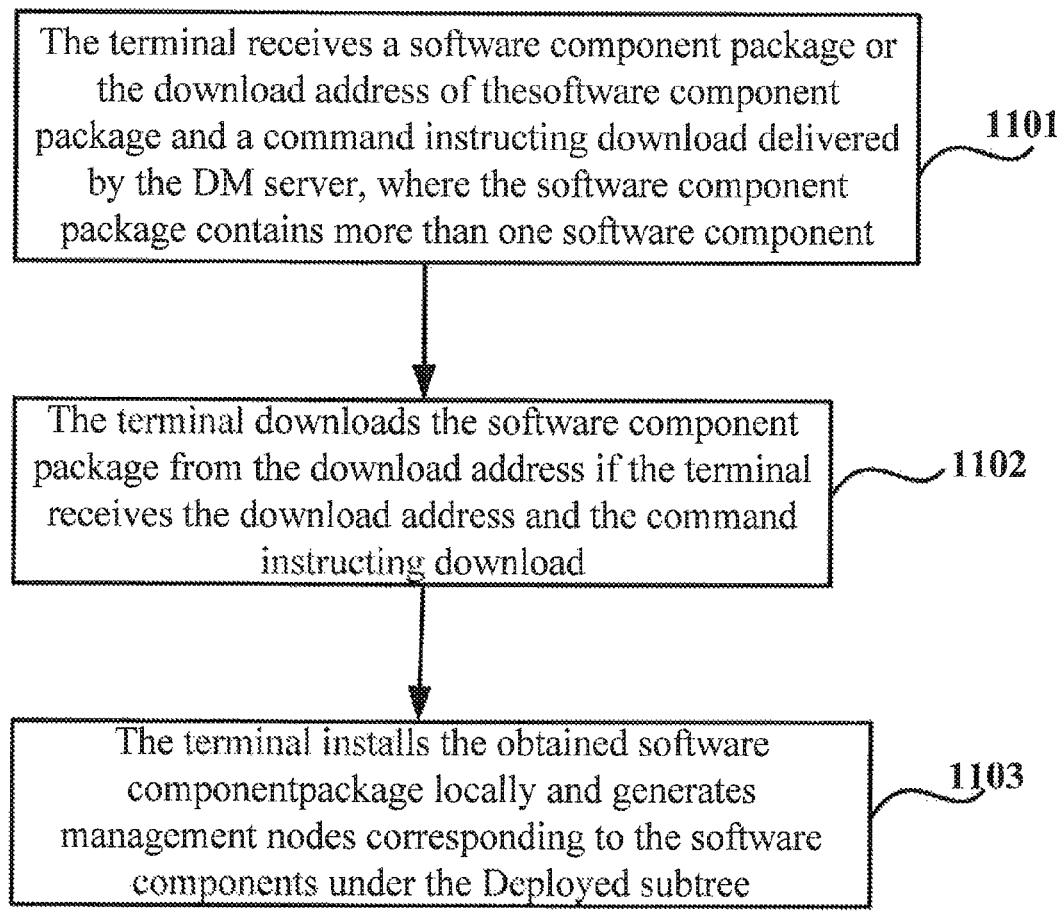
FIG. 11 shows a workflow of a terminal in an embodiment of the disclosure.

The workflow of the terminal provided in the embodiment of the disclosure is shown in FIG. 11. The workflow includes:

Step 1101: The terminal receives a software component package or a download address of the software component package and a command instructing to download delivered by a DM server, where the software component package contains more than one software component;

Step 1102: If the terminal receives the download address and the command instructing to download, the terminal downloads the software component package according to the download address; and Step 1103: The terminal installs the obtained software component package locally and generates management nodes corresponding to the software components as well as subnodes of the management nodes.

To enhance the security of the terminal, it is necessary to assign access control rights to the management node and the subnodes generated by the terminal. In the download process, the specific operation steps are: if the command instructing to download is DownLoad, after the software component package is downloaded and before the software component package is installed, or if the command instructing to download is DownLoadInstall or DownLoadInstallInactive, if the download is successful but the installation fails, the terminal generates a management node corresponding to the software component package under the Delivered subtree of the SCOMO and assigns access control rights to the management node and each subnode of the management node.

Before the management node corresponding to the software component package is generated under the Delivered subtree, to avoid data redundancy and realize upgrade of the software components, the terminal needs to judge whether the ID of the downloaded software component package is identical with the ID of a software component package corresponding to a management node already existing under the Delivered subtree; and if so, the terminal modifies information of the management node under the Delivered subtree to information of the downloaded software component package; otherwise, the terminal generates a management node corresponding to the downloaded software component package under the Delivered subtree.

If a management node is already generated for the software component package under the Download subtree before the terminal receives the information delivered by the DM server, one method for assigning access control rights is: the terminal sets access control rights of the management node generated under the Download subtree as access control rights of the management node generated under the Delivered subtree. If the terminal judges that the downloaded software component package is identical with a software component package corresponding to a management node already existing under the Delivered subtree, another method for assigning access control rights is: the terminal sets a sum of access control rights of the management node corresponding to the software component package generated under the Download subtree and access control rights of the management node already existing under the Delivered subtree as access control rights of the management node under the Delivered subtree.

In addition to assigning access control rights to the management node, the terminal also needs to assign access control rights to subnodes of the management node. The specific method is: the terminal lets the subnodes of the management node generated under the Delivered subtree inherit access control rights of the management node, or set access control rights of an executable node under the Download subtree as access control rights of an executable node of the management node generated under the Delivered subtree.

After the terminal downloads the software component package, the terminal receives the DM command delivered by the DM server for a Delivered subtree node and judges whether the DM server has the right to execute the DM command on the node according to the access control rights assigned to the node, and if the DM server has the right, executes the DINA command on the node.

If the installation process requires a parameter, the terminal also receives a parameter delivered by the DM server and installs the downloaded software component package locally according to the parameter.

After the terminal executes the installation and before management nodes corresponding to the software components are generated under the Deployed subtree, the terminal further judges whether one software component in the software component package is identical with a software component corresponding to a management node already existing under the Deployed subtree and if so, modifies information of the management node under the Deployed subtree to information of the software component in the software component package; otherwise, the terminal generates a management node corresponding to the software component in the software component package under the Deployed subtree.

The terminal may generate management nodes corresponding to software components in the software component package under the Deployed subtree in multiple methods. For example, before receiving the software component package directly delivered by the DM server via a DM command, the terminal generates a management node corresponding to the software component package under the Delivered subtree according to the instruction of the DM server, where the management node includes software component information, and stores the software component information included in the management node under the Delivered subtree to the Deployed subtree.

After the terminal generates management nodes corresponding to the software components in the software component package under the Deployed subtree, the terminal needs to assign access control rights to the management nodes and their subnodes.

The method for assigning access control rights includes but is not limited to setting access control rights of the management node corresponding to the software component package under the Delivered or Download subtree as access control rights of the management nodes generated under the Deployed subtree; letting the subnodes of the management nodes generated under the Deployed subtree inherit the access control rights of the management nodes; or setting access control rights of an executable node under the Delivered or Download subtree as access control rights of executable nodes of the management nodes generated under the Deployed subtree.

After the terminal generates the management nodes corresponding to the software components under the Deployed subtree, the terminal receives the DM command delivered by the DM server for a Deployed subtree node and judges whether the DM server has the right to execute the DM command on the node according to the access control rights assigned to the node, and if the DM server has the right, executes the DM command on the node.

If the command instructing to download carries DownLoad as an indirect download instruction, after the download is successful and before the software component package is installed, the terminal reports a download response message to the DM server, where the download response message includes the URI of the management node generated under the Delivered subtree. After the management nodes corresponding to the software components are generated under the Deployed subtree of the SCOMO, the terminal reports an installation response message to the DM server, where the installation response message includes URIs of the management nodes generated under the Deployed subtree.

The download response message and the installation response message are reported in a synchronous or asynchronous mode.

If the reporting mode is synchronous, the terminal carries the URI in the download response message or the installation response message via the Target sub-element of an Item element of a Status command.

The download response message further includes a name and/or ID of the software component package; the installation response message further includes names and/or IDs of the software components.

If Download is used to indicate direct or indirect download, after generating the management nodes corresponding to the software components under the Deployed subtree, the terminal sets the state of the software component package to Installed.

Figure 12:
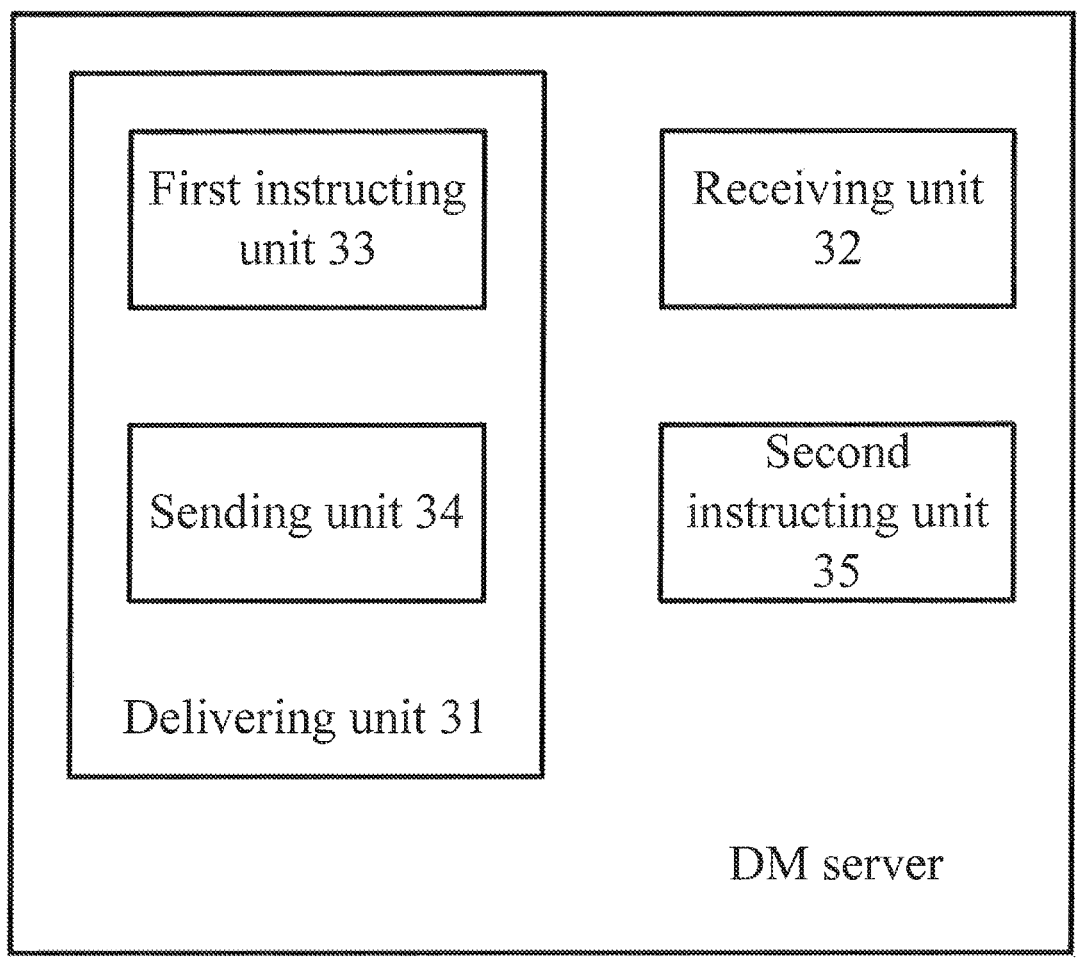
FIG. 12 shows a structure of a DM server in an embodiment of the disclosure.

An embodiment of the disclosure provides a DM server. As shown in FIG. 12, the DM server includes a delivering unit 31, adapted to deliver a software component package directly to a terminal via a DM command, or deliver a download address of the software component package and a command instructing to download to the terminal, where the software component package contains more than one software component.

The DM server further includes a receiving unit 32, adapted to receive a message reported by the terminal, where the message includes one or more of the following items: URI of a management node generated under the Delivered subtree, URIs of management nodes generated under the Deployed subtree, name and ID of the software component package, and names and Ms of the software components.

The delivering unit 31 is further adapted to deliver a parameter to the terminal before the terminal installs the software component package.

The delivering unit 31 includes a first instructing unit 33 and a sending unit 34, where the first instructing unit 33 is adapted to instruct the terminal to generate a management node for the software component package under the Download subtree and add a subnode for the management node if the download is indirect, or if the download is direct, instruct the terminal to generate a management node for the software component package under the Delivered subtree and add a subnode for the management node. The sending unit 34 is adapted to send the parameter to the subnode added under the Download or Delivered subtree.

The delivering unit 31 is further adapted to deliver the parameter to the terminal via a DM command, which instructs the terminal to execute the installation.

The DM server further includes a second instructing unit 35, adapted to instruct the terminal to generate a management node corresponding to the software component package under the Delivered subtree before the delivering unit 31 delivers the software component package directly to the terminal via the DM command, where the management node includes software component information.

Figure 13:
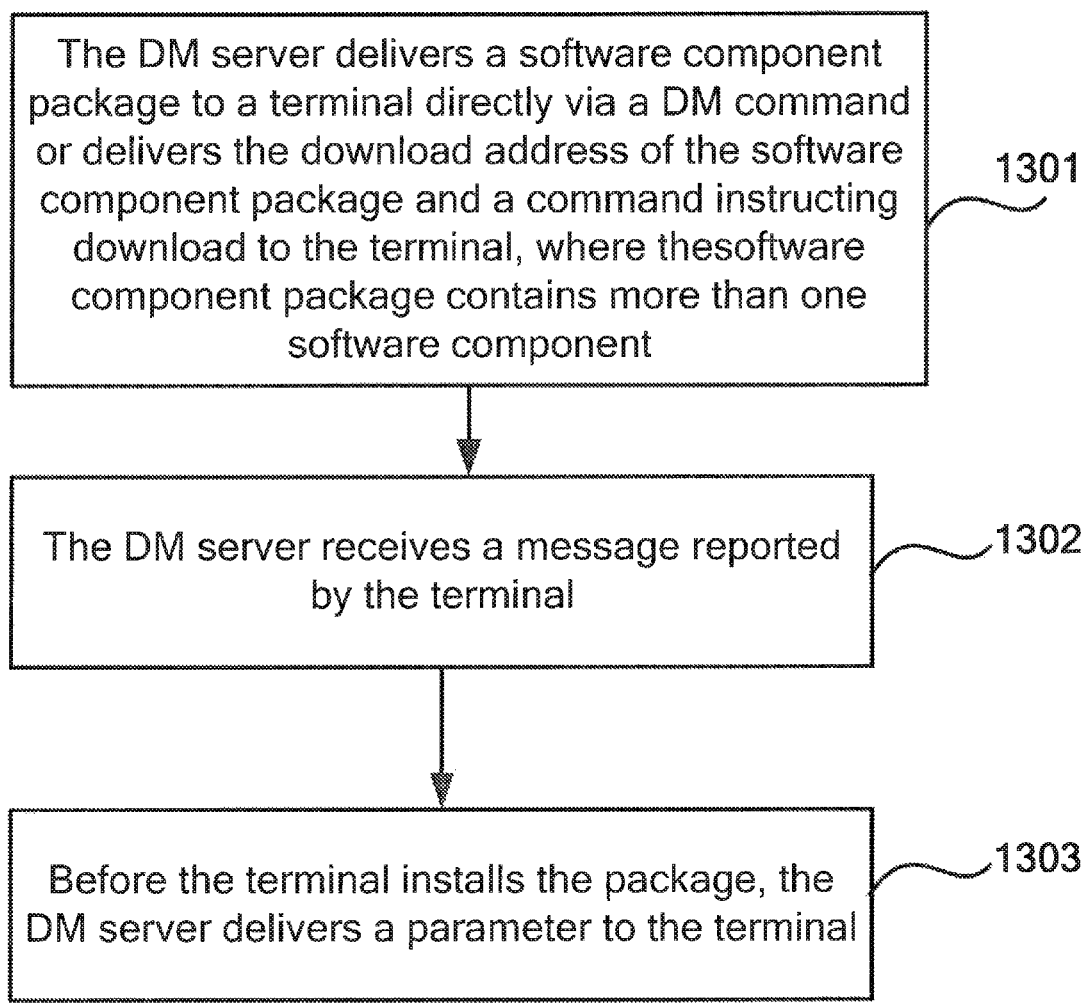
FIG. 13 shows a workflow of a DM server in an embodiment of the disclosure.

The workflow of the DM server provided in the embodiment of the disclosure is shown in FIG. 13. The workflow includes:

Step 1301: The DM server delivers a software component package directly to a terminal via a DM command, or delivers a download address of the software component package and a command instructing to download to the terminal, where the software component package contains more than one software component.

Step 1302: The DM server receives a message reported by the terminal, where the message includes one or more of the following items: URI of a management node generated under the Delivered subtree, URIs of management nodes generated under the Deployed subtree, name and ID of the software component package, and names and IDs of the software components.

Step 1303: Before the terminal installs the software component package, the DM server delivers a parameter to the terminal. The delivery method may include:

1. If the download is indirect, the DM server instructs the terminal to generate a management node for the software component package under the Download subtree and add a subnode for the management node. If the download is direct, the DM server instructs the terminal to generate a management node for the software component package under the Delivered subtree and add a subnode for the management node; then the DM server delivers the parameter to the subnode added under the Download or Delivered subtree.

2. The DM server delivers the parameter to the terminal via a DM command, which instructs the terminal to execute the installation.

Before the DM server delivers the software component package directly to the terminal via the DM command, the DM server instructs the terminal to generate a management node corresponding to the software component package under the Delivered subtree, where the management node includes software component information.

The features recorded in the first embodiment may be parallel. For example, in different download processes, the technical feature in receiving the delivered parameter by the terminal, the technical feature in assigning access control rights to the management node and subnode generated by the terminal, the technical feature in reporting the name or ID of the management node and URI of the target management node to the DM server synchronously or asynchronously, the technical feature in judging whether the management node corresponding to the same software component or the same software component package exists, the technical feature in processing upon successful download and unsuccessful installation, and the technical feature in including software component information in the management node corresponding to the software component package may be parallel or combined. There are multiple possible combinations. The following two embodiments are described to show that the features may be combined in any way.

Figure 14:
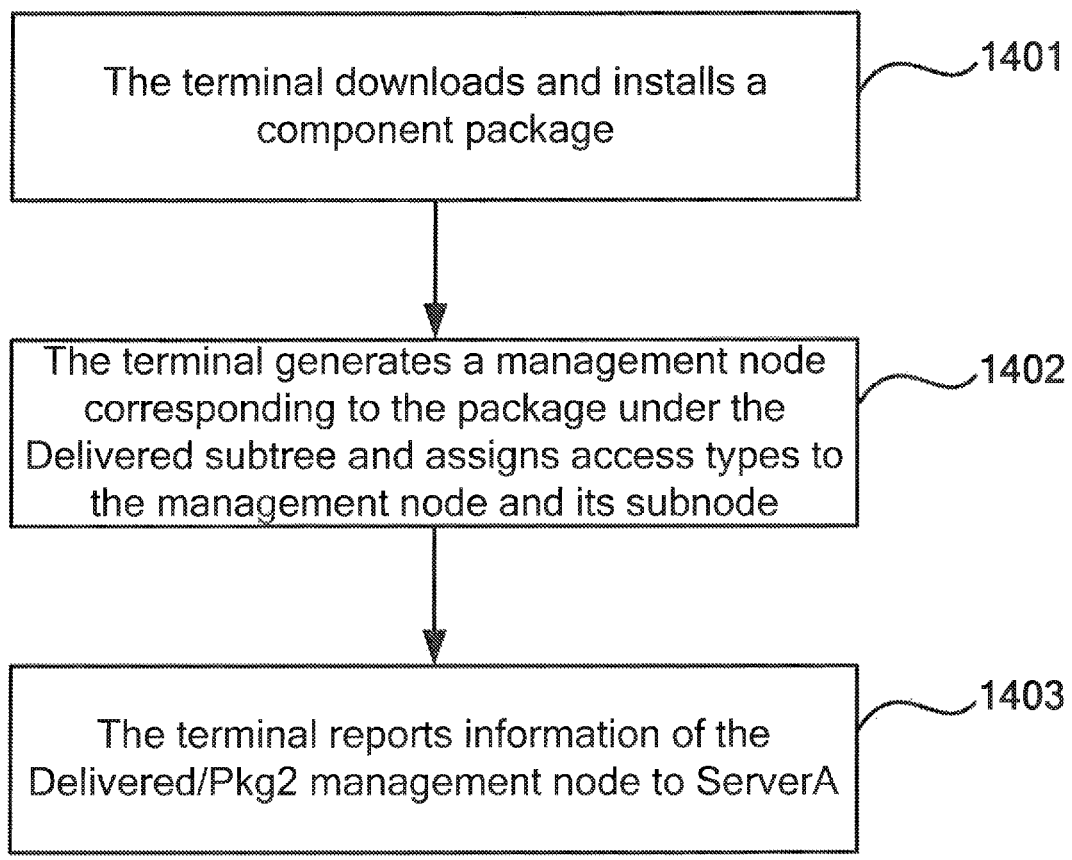
FIG. 14 shows a flowchart of a method in a second embodiment of the disclosure.

In the second method embodiment of the disclosure, download and installation are implemented via the DownLoadInstall instruction in the case of indirect download. In this embodiment, the DM server is ServerA, the software component package name is ascendo, and the software component package ID is PkgID_2. The software component package contains three software components named ascendo_1, ascendo_2, and ascendo_3. The IDs of the software components are respectively ComID_1, ComID_2, and ComID_3. The download is successful but the installation fails. The flowchart is shown in FIG. 14, including:

Step 1401: The terminal downloads and installs the software component package.

Figure 15:
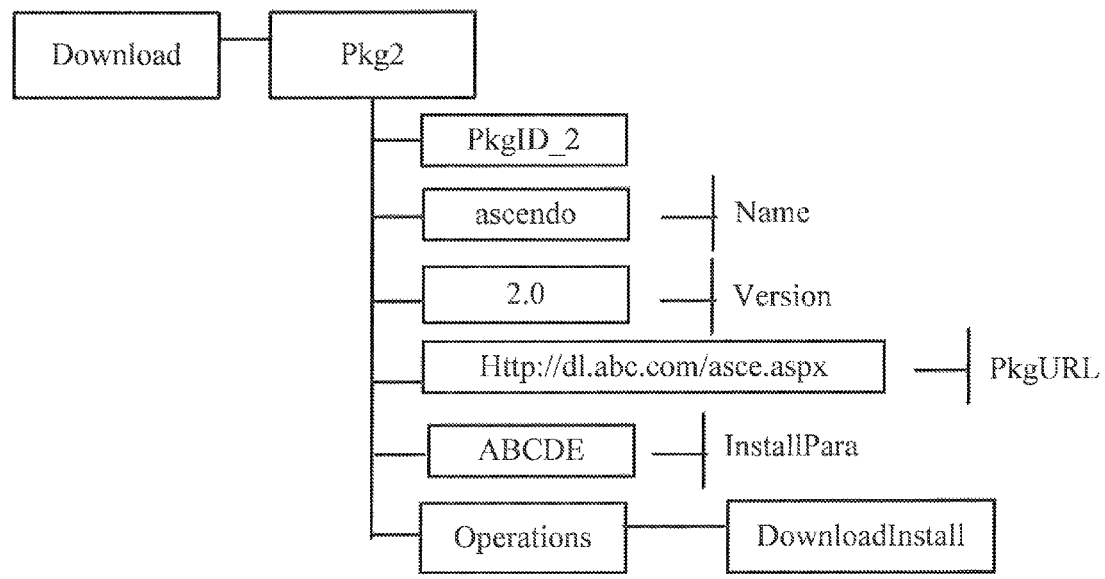
FIG. 15 shows a structure of a SCOMO where a Pkg2 management node is generated under the Download subtree.

ServerA instructs the terminal to generate a management node corresponding to the software component package under the Download subtree of the SCOMO of the terminal and assign values to the management node, including the name, version, download address and parameter of the software component package, as shown in FIG. 15. The parameter delivery process may be the same as described in the first embodiment, or another process.

After the management node corresponding to the software component package is generated under the Download subtree, ServerA assigns access control rights to the management node and subnodes. For example, the access control rights of the Download/Pkg2 management node are set to Get=*&Add=ServerA&Replace=ServerA. The access control rights of the Download/Pkg2/Operations/DownloadInstall subnode are Get=*&Exec=ServerA. Other subnodes inherit access control rights of their parent nodes.

Then, ServerA sends an Exec command to the terminal, where the Target element indicates that the executable node executing the download operation is Download/Pkg2/Operations/DownloadInstall. The specific operation may be implemented via the following program:

```
<Exec>
<CmdID>4</CmdID>
<Correlator>abc123</Correlator>
<Item>
<Target>
<LocURI>./SCOMO/Download/Pkg2/Operations/DownloadInstall<
/LocURI>
</Target>
</Item>
</Exec>
```

After downloading the software component package, the terminal installs the software component package directly. Suppose the installation fails for some reason and the software component package is retained in the terminal.

Step 1402: The terminal generates a management node corresponding to the software component package under the Delivered subtree and assigns access control rights to the management node and its subnodes.

Figure 16:
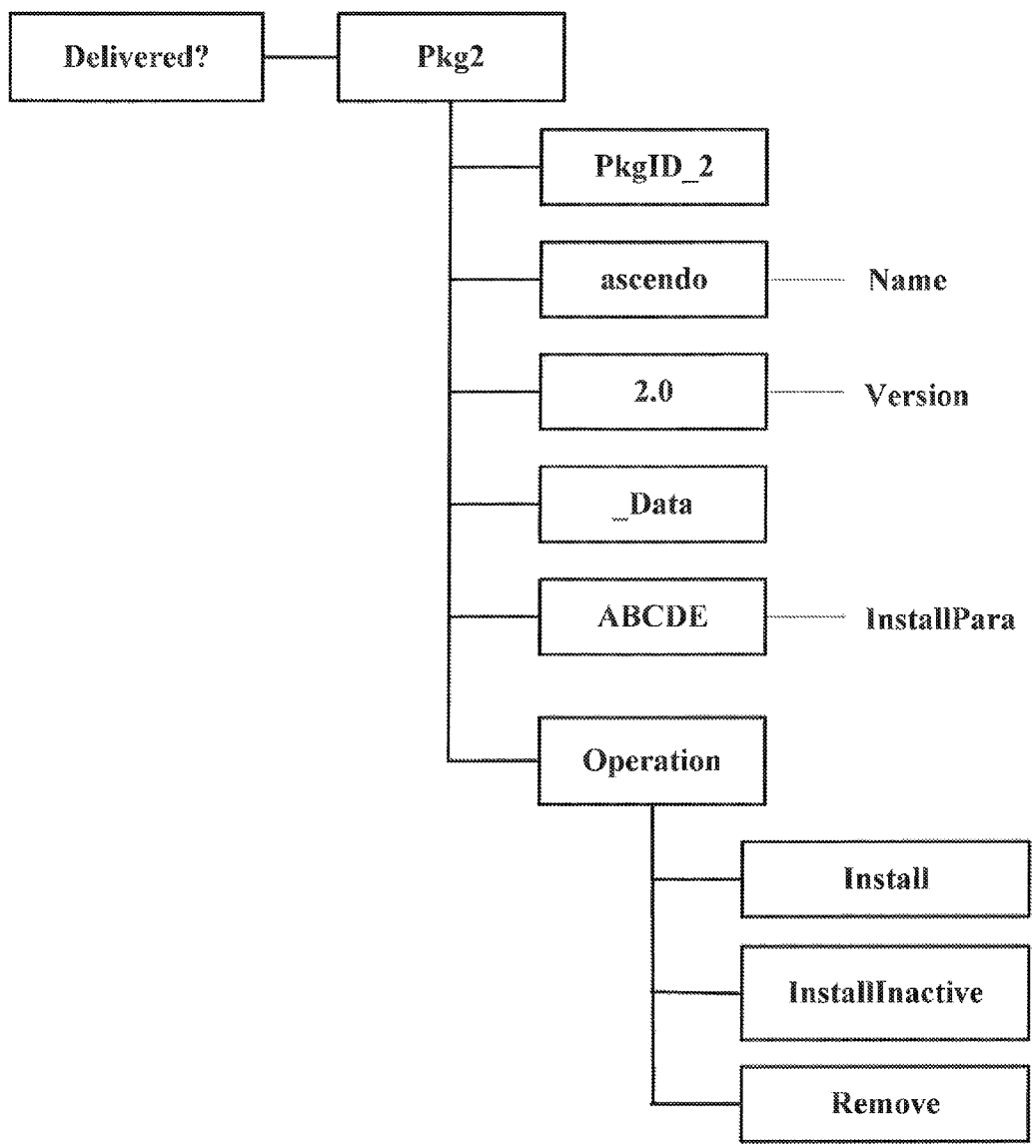
FIG. 16 shows a structure of a SCOMO where a Pkg2 management node is generated under the Delivered subtree.

Before generating the management node corresponding to the software component package under the Delivered subtree, the terminal needs to determine whether a management node corresponding to a software component package identical with the downloaded software component package already exists under the Delivered subtree. If such a management node does not exist, the terminal generates the Delivered/Pkg2 management node and stores specific information of Delivered/Pkg2, including the name, version, and parameter information to the new Delivered/Pkg2 management node, as shown in FIG. 16; otherwise, the terminal modifies information of the existing Delivered/Pkg2 to information of the current software component package. Similarly, no matter whether a same management node exists, the terminal assigns access control rights to the Delivered/Pkg2 management node and the subnodes in the same process as in the first embodiment.

Step 1403: The terminal reports information of the Delivered/Pkg2 management node to ServerA.

After the Delivered/Pkg2 management node is generated, the terminal reports the URI and Delivered/Pkg2/NAME information of the management node to ServerA via an Alert command, as in the following program:

```
<Alert>
    <CmdID>2</CmdID>
    <Data>1226</Data> <!-- Generic Alert -->
    <Correlator>abc123</Correlator>
    <Item>
    <Source><LocURI>./SCOMO/Download/Pkg2/Operations/
DownloadInstall</LocURI></Source>
    <Target><LocURI>./SCOMO/Inventory/Delivered/Pkg2</
LocURI></Target>
        <Meta>
            <Type xmlns="syncml:metinf">
org.openmobilealliance.softwarecomponent.OperationComplete
            </Type>
        </Meta>
    </Item>
</Alert>
```

After ServerA receives the operation result reported by the terminal as well as the carried URI information, ServerA may initiate an Install operation directly on the Delivered subtree. This spares a re-download process and therefore reduces loads of the network and the terminal.

Like the foregoing terminal, a terminal and a DM server may be provided according to the second embodiment. The terminal and the DM server utilize the technical method described in the second embodiment and are able to implement the steps of the second embodiment.

Figure 17:
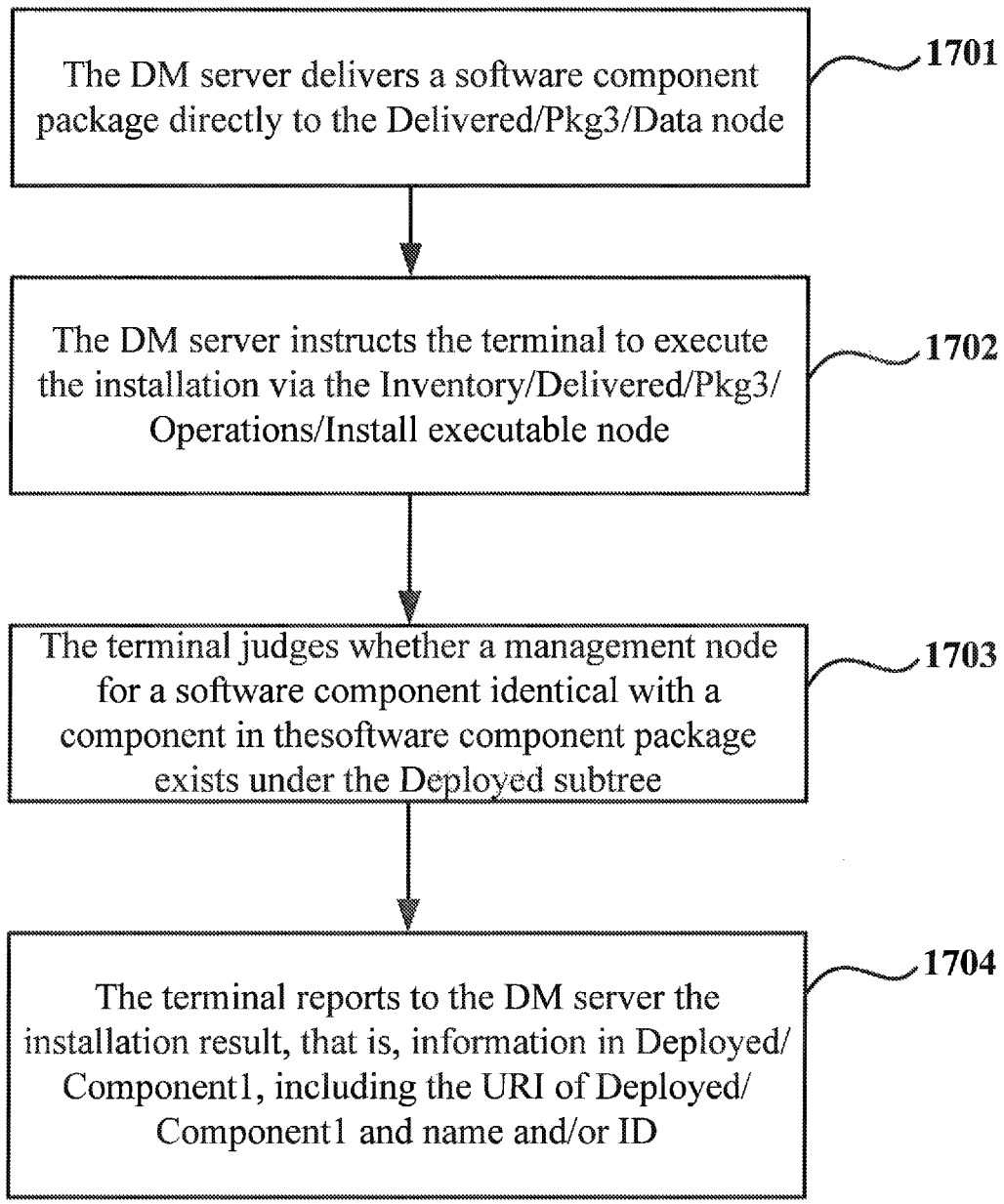
FIG. 17 shows a flowchart of a method in a third embodiment of the disclosure.

In the third embodiment, ServerA uses the direct download mode. In this embodiment, the name of the software component package is ascendo and the ID of the software component package is PkgID_3. The software components in the software component package are named ascendo_1, ascendo_2, and ascendo_3 and identified as ComID_1, ComID_2, and ComID_3. After the download is complete, the Install executable node executes the installation, as shown in FIG. 17.

Step 1701: DM server (namely "ServerA") delivers the software component package directly to the Delivered/Pkg3/Data node.

Figure 18:
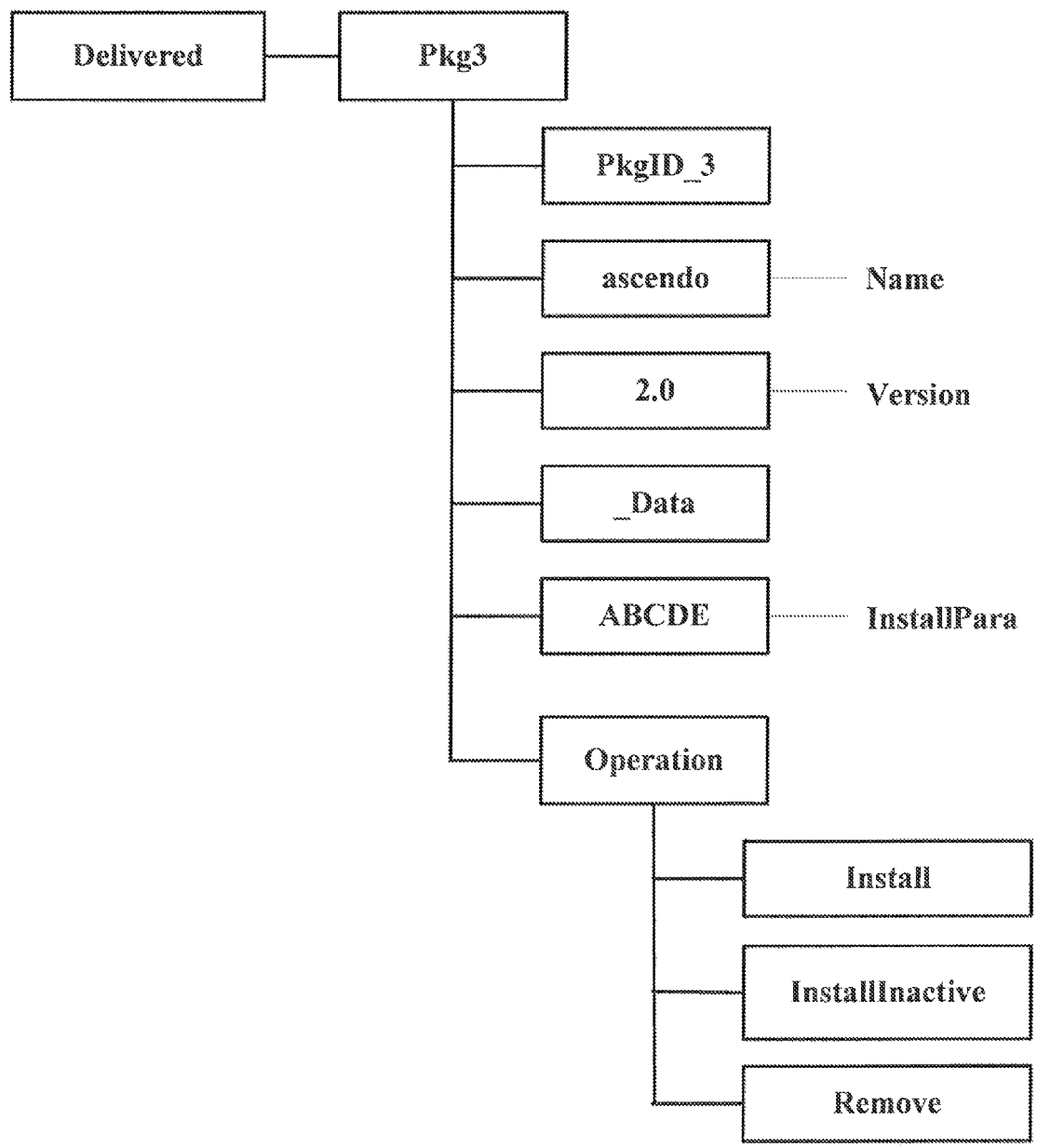
FIG. 18 shows a structure of a SCOMO where a Pkg3 management node is generated under the Delivered subtree.

ServerA generates a Pkg3 management node corresponding to the software component package under the Delivered subtree and assigns values to the management node, including the software component name, version, and parameter information, as shown in FIG. 18. ServerA assigns access control rights to the management node. For example, the access control rights of Delivered/Pkg3 are set to Get=*&Add=*&Replace=ServerA. The access control rights of the executable subnodes of Delivered/Pkg3/Operations are Get=*&Exec=ServerA.

Step 1702: ServerA instructs the terminal to execute the installation via the Inventory/Delivered/Pkg3/Operations/Install executable node. Specifically, this may be implemented via the following program:

```
<Exec>
    <CmdID>5</CmdID>
    <Correlator>abc123</Correlator>
    <Item>
    <Target>
    <LocURI>./SCOMO/Inventory/Delivered/Pkg3/Operations/Install</
LocURI>
    </Target>
    </Item>
</Exec>
```

After receiving the installation instruction, the terminal judges the right of ServerA. If the judgment result indicates that ServerA has the right to access and control Inventory/Delivered/Pkg3/Operations/Install (which means the DM server has the Exec right), the terminal instructs the Install program of the software component package to install the software component package and returns the Status Code 202 of the Exec command to ServerA. The Status Code 202 indicates that the terminal has received data successfully and is now processing the data. If the installation process requires a parameter, the terminal may obtain the parameter from Inventory/Delivered/Pkg3/InstallPara.

Step 1703: The terminal judges whether a management node for a software component identical with a software component in the software component package exists under the Deployed subtree.

Figure 19:
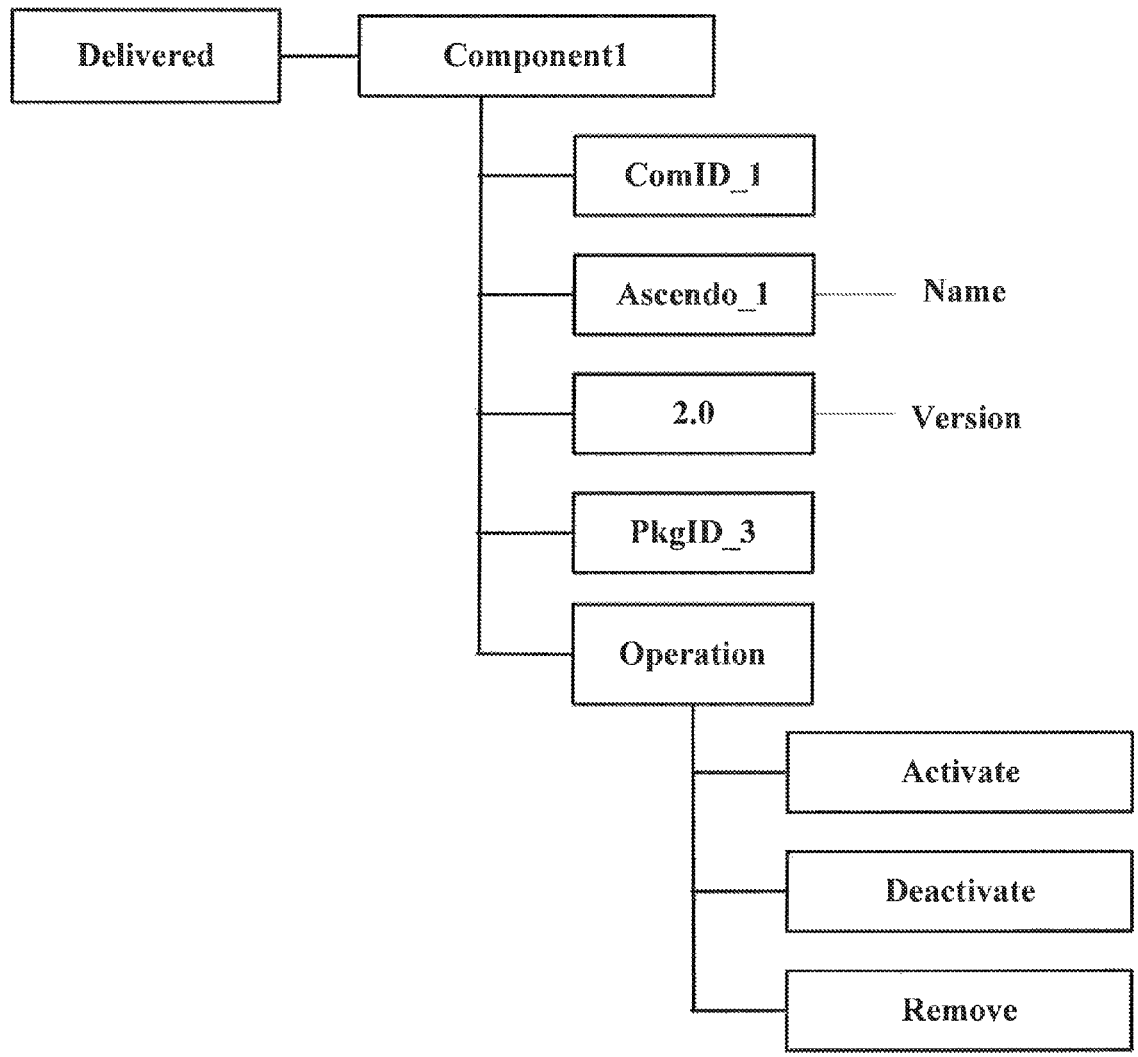
FIG. 19 shows a structure of a SCOMO where a Component1 management node is generated under the Deployed subtree.

This embodiment takes the software component named ascendo_1 for example. Suppose there is no management node with the software component name (Name node) as ascendo_1 under the Deployed subtree. Then, the terminal generates a management node for ascendo_1 and subnodes of the management node under the Deployed subtree and assigns values and access control rights to the management node and the subnodes, as shown in FIG. 19. The process of assigning access control rights may also be the same as in the first embodiment. For example, the terminal sets access control rights of the ./SCOMO/Inventory/Deployed/Component1 node to the same as access control rights of the ./SCOMO/Inventory/Delivered/Pkg3 node, that is, Get=*&Add=ServerA&Replace=ServerA. The access control rights of the executable subnodes of ./SCOMO/Inventory/Deployed/Component1/Operations are set to the same as the access control rights of the ./SCOMO/Inventory/Delivered/Pkg3/Operations/Install node, that is, Get=*&Exec=ServerA.

Step 1704: The terminal reports to ServerA the installation result, that is, information in Deployed/Component1, including the URI of Deployed/Component1 and name and/or ID.

The installation response message may be reported via a Generic Alert command, where the Result Code reported is carried in a Data element of the Generic Alert, and the URI executing the installation instruction is carried in a Source element, and the Deployed subtree path information after the component is installed is carried in a Target element. The software component name and/or ID information is carried in the extendable element EMI of the MetaInf of the Alert. The operation is implemented via the following program:

```
<Alert>
    <CmdID>6</CmdID>
    <Data>1226</Data> <!-- Generic Alert -->
    <Correlator>abc123</Correlator>
    <Item>
        <Source><LocURI>./SCOMO/Inventory/Delivered/Pkg3/
        Operations/Install
    </Source>
    <Target><LocURI>./SCOMO/Inventory/Deployed/Component1</
    LocURI></Target>
        <Meta>
            <Typexmlns="syncml:metinf">
org.openmobilealliance.softwarecomponent.OperationComplete
            </Type>
            <Format xmlns="syncml:metinf"> text/plain
            </Format>
            <Mark xmlns="syncml:metinf">critical</Mark>
            <EMI xmlns="syncml:metinf" > ComID_1</EMI>
<!-- ID of a component under the Deployed subtree -->
        </Meta>
        <Data>200</Data> <!-- Result Code -->
    </Item>
</Alert>
```

The information reported in the EMI may be the name and/or ID.

Like the foregoing terminal, a terminal and a DM server may also be provided according to the third embodiment. The terminal and the DM server utilize the technical method described in the third embodiment and are able to implement the steps of the third embodiment.

It is understandable to those skilled in the art that all or part of the steps of the foregoing embodiments can be implemented by hardware following instructions of programs. The programs may be stored in a computer readable storage medium. When the programs are executed, the steps of the foregoing embodiments are executed, and the storage medium may be any medium that can store program codes such as a Read-Only Memory (ROM), a Random Access Memory (RAM), a magnetic disk and a compact disk.

With the foregoing first, second and third embodiments and the foregoing system and terminal, the following advantages can be obtained:

1. Because parameters are supported in the installation of a software component package, a user may utilize a device to generate a more flexible software component package without the need to generate a specific software component package for each installation. This lessens the load on the server and enables personalized installation of the same software component package, thus giving a better user experience.

2. In the conventional art, the DM server assigns access control rights to the management node generated by itself but is unable to set access control rights or unable to set reasonable access control rights for a management node later generated by the terminal. As a result, the security is weakened. By setting access control rights for a management node and its subnodes generated by the terminal, the specified device can manage the data and therefore the reliability is higher.

3. The terminal reports the software component package name, software component name and URI information to the DM server so that the DM server is able to recognize a software component more accurately and therefore, it is easier for the DM server to carry out subsequent operations.

4. When the terminal generates the management node, the terminal judges whether a same management node already exists under the subtree. This reduces the redundancy of software components in the terminal and enables update and upgrade of software components in the terminal, thus assuring that software components in the terminal are in the latest version.

5. A software component package that is downloaded successfully but fails to be installed is processed so that the software component package can be installed later again. This spares the trouble of re-download for reinstallation and reduces the loads on the network and the server.

6. When a management node corresponding to a software component package is generated, the management node includes information of software components so that it is convenient to generate management nodes corresponding to the software components later after the installation is successful.

Although the present disclosure has been described through some exemplary embodiments, the invention is not limited to such embodiments. It is apparent that those skilled in the art can make various modifications and variations to the invention without departing from the spirit and scope of the invention. The invention is intended to cover these modifications and variations provided that they fall in the scope of protection defined by the following claims or their equivalents.

What is claimed is:

1. A method for installing software components, comprising:
   receiving, by a terminal, a software component package directly delivered by a Device Management (DM) server or a download address of the software component package and a command instructing to download delivered by the DM server, wherein the software component package contains one or more software components;
   if the terminal receives the download address and the command instructing to download, downloading, by the terminal, the software component package according to the download address;
   installing, by the terminal, the obtained software component package locally and generating management nodes corresponding to the software components as well as subnodes of the management nodes under a Deployed subtree of a Software Component Management Object (SCOMO); and
   assigning access control rights to the management nodes and the subnodes of the management nodes,
   wherein the step of assigning access control rights to the management nodes comprises: assigning access control rights of the management node corresponding to the software component package generated under the Delivered or Download subtree to the management nodes generated under the Deployed subtree, wherein the step of generating management nodes corresponding to the software components as well as subnodes of the management nodes under a Deployed subtree of the SCOMO comprises: obtaining, by the terminal, an ID of one software component and assigning the ID to a value of an ID subnode of the management node corresponding to the software component under the Deployed subtree of the SCOMO, and wherein the ID of the software component is provided by a network and delivered to the terminal as a part of the software component package or delivered to the terminal independently of the software component package, and wherein the step of assigning access control rights to subnodes of the management nodes comprises: letting the subnodes of the management nodes generated under the Deployed subtree inherit access control rights of the management nodes, and/or assigning access control rights of executable nodes under the Delivered or Download subtree to executable nodes of the management nodes generated under the Deployed subtree.

2. The method of claim 1, wherein if the command instructing to download is DownLoad, after the terminal downloads the software component package according to the download address and before the software component package is installed locally, or if the command instructing to download is DownLoadInstall or DownLoadInstallInactive, when the terminal downloads the software component package successfully but fails to install the software component package, the method further comprises: generating, by the terminal, a management node corresponding to the software component package and subnodes of the management node under a Delivered subtree in the SCOMO and assigning access control rights to the management node and the subnodes of the management node.

3. The method of claim 2, wherein before the DM server delivers the command instructing to download, the method further comprises:

generating a management node for the software component package under a Download subtree of the SCOMO;

wherein the step of assigning access control rights to the management node under the Delivered subtree comprises: assigning access control rights of the management node generated under the Download subtree to the management node generated under the Delivered subtree.

4. The method of claim 2, wherein the step of assigning access control rights to subnodes of the management node under the Delivered subtree comprises at least one of following modes: letting the subnodes of the management node generated under the Delivered subtree inherit access control rights of the management node, and assigning access control rights of executable nodes under the Download subtree to executable nodes under the management node generated under the Delivered subtree.

5. The method of claim 2, wherein before the DM server delivers the command instructing to download, the method further comprises:

generating a management node for the software component package under a Download subtree of the SCOMO; and wherein the step of assigning access control rights to the management node under the Delivered subtree comprises: setting access control rights of the management node generated under the Delivered subtree to null so that the management node inherits access control rights of its parent node.

6. The method of claim 1, further comprising:

delivering, by the DM server, parameters to the terminal; and downloading, by the terminal, the software component package, or installing the software component package; or removing the software component package; or activating the software components; or deactivating the software components; or removing the software components, according to the parameters;

wherein the step of delivering the parameters to the terminal comprises: delivering, by the DM server, the parameters to a subnode after the subnode is added under the SCOMO tree of the terminal.

7. The method of claim 1, wherein after installing the software component package and before generating management nodes corresponding to the software components as well as subnodes of the management nodes, the method further comprises: judging whether one software component in the software component package is identical with a software component corresponding to a management node and subnodes of the management node already existing under the Deployed subtree, and if so, modifying information of the management node and the subnodes already existing under the Deployed subtree to information of the software component in the software component package, or else, generating a management node and subnodes of the management node corresponding to the software component in the software component package under the Deployed subtree.

8. The method of claim 6, wherein after modifying information of the management node and the subnodes already existing under the Deployed subtree to information of the software component in the software component package if it is judged that one software component in the software component package is identical with a software component corresponding to a management node and subnodes of the management node already existing under the Deployed subtree, the method further comprises: assigning a combination of access control rights of the management node generated for the software component package under the Delivered or Download subtree and access control rights of the management node already existing under the Deployed subtree to the management node generated under the Deployed subtree.

9. The method of claim 1, wherein after generating management nodes corresponding to the software components as well as subnodes of the management nodes under the Deployed subtree of the SCOMO, the method further comprises: reporting, by the terminal, an installation response message to the DM server, and wherein the installation response message comprises; Uniform Resource Identifiers (URIs) of the management nodes generated under the Deployed subtree.

10. The method of claim 8, wherein the installation response message is reported in a synchronous mode or an asynchronous mode; and wherein if the synchronous reporting mode is applied, the URI in the installation response message is carried in an ITEM element of a STATUS command.

11. The method of claim 8, wherein the installation response message further comprises: names and/or IDs of the software components.

12. A terminal, comprising:

a receiving unit, adapted to receive a software component package delivered by a Device Management (DM) server or a download address of the software component package and a command instructing to download delivered by the DM server, wherein the software component package contains more than one software component;

a downloading unit, adapted to download the software component package according to the download address if the terminal receives the download address and the command instructing to download;

an installing unit, adapted to install the obtained software component package locally and generate management nodes corresponding to the software components as well as subnodes of the management nodes under a Deployed subtree of a Software Component Management Object (SCOMO); and a second right assigning unit, adapted to assign access control rights to the management nodes and the subnodes of the management nodes, wherein the second right assigning unit is further adapted to assign access control rights of the management node corresponding to the software component package generated under the Delivered or Download subtree to access control rights of the management nodes generated under the Deployed subtree, wherein the step of generating management nodes corresponding to the software components as well as subnodes of the management nodes under a Deployed subtree of the SCOMO comprises: obtaining, by the terminal, an ID of one software component and assigning the ID to a value of an ID subnode of the management node corresponding to the software component under the Deployed subtree of the SCOMO, and wherein the ID of the software component is provided by a network and delivered to the terminal as a part of the software component package or delivered to the terminal independently of the software component package, and wherein the step of assigning access control rights to subnodes of the management nodes comprises: letting the subnodes of the management nodes generated under the Deployed subtree inherit access control rights of the management nodes, and/or assigning access control rights of executable nodes under the Delivered or Download subtree to executable nodes of the management nodes generated under the Deployed subtree.

13. The terminal of claim 12, wherein if the command instructing to download is DownLoad, after the terminal downloads the software component package according to the download address and before the software component package is installed locally, or if the command instructing to download is DownLoadInstall or DownLoadInstallInactive, when the terminal downloads the software component package successfully but fails to install the software component package, the method further comprises:

a first generating unit, adapted to generate a management node and subnodes of the management node corresponding to the software component package under a Delivered subtree; and a first right assigning unit, adapted to assign access control rights to the management node and the subnodes of the management node.

14. The terminal of claim 12, further comprising a reporting unit, adapted to report an installation response message to the DM server after the management nodes corresponding to the software components are generated under the Deployed subtree of the SCOMO, wherein the installation response message comprises: URIs of the management nodes generated under the Deployed subtree.

15. A system for installing software components, comprising:

a Device Management (DM) server, adapted to deliver a software component package directly to a terminal or deliver a download address of the software component package and a command instructing to download to the terminal, wherein the software component package contains more than one software component; and the terminal, adapted to receive the software component package delivered by the DM server, or the download address of the software component package and the command instructing to download delivered by the DM server, and if the download address and the command instructing to download are received, download the software component package from the download address, install the obtained software component package locally, and generate management nodes corresponding to the software components and subnodes of the management nodes under a Deployed subtree;

wherein the terminal is further adapted to assign access control rights to the management nodes and the subnodes of the management nodes, and wherein the terminal is further adapted to assign access control rights of the management node corresponding to the software component package under the Delivered or Download subtree to the management nodes generated under the Deployed subtree, wherein the generating management nodes corresponding to the software components as well as subnodes of the management nodes under a Deployed subtree of the SCOMO comprises: obtaining, by the terminal, an ID of one software component and assigning the ID to a value of an ID subnode of the management node corresponding to the software component under the Deployed subtree of the SCOMO, and wherein the ID of the software component is provided by a network and delivered to the terminal as a part of the software component package or delivered to the terminal independently of the software component package, and wherein the assigning access control rights to subnodes of the management nodes comprises: letting the subnodes of the management nodes generated under the Deployed subtree inherit access control rights of the management nodes, and/or assigning access control rights of executable nodes under the Delivered or Download subtree to executable nodes of the management nodes generated under the Deployed subtree.

16. The system of claim 15, wherein if the command instructing to download is DownLoad, after the terminal downloads the software component package from the download address and before the software component package is installed locally, or if the command instructing to download is DownLoadInstall or DownLoadInstallInactive, when the terminal downloads the software component package successfully but fails to install the software component package: the terminal is further adapted to generate a management node corresponding to the software component package and subnodes of the management node under a Delivered subtree and assign access control rights to the management node and the subnodes of the management node.

17. The system of claim 16, wherein the DM server is further adapted to instruct the terminal to generate a management node for the software component package under a Download subtree before delivering the command instructing to download; and wherein the terminal is further adapted to assign access control rights of the management node generated under the Download subtree to the management node generated under the Delivered subtree.

18. The system of claim 15, wherein the terminal is further adapted to obtain an ID of one software component and assigning the ID to a value of an ID subnode of the management node corresponding to the software component under the Deployed subtree of the SCOMO, and wherein the ID of the software component is provided by a network and delivered to the terminal as a part of the software component package or delivered to the terminal independently of the software component package.

* * * * *